(12) United States Patent
Yang

(10) Patent No.: US 9,438,625 B1
(45) Date of Patent: Sep. 6, 2016

(54) MITIGATING SCRIPTED ATTACKS USING DYNAMIC POLYMORPHISM

(71) Applicant: SHAPE SECURITY, INC., Mountain View, CA (US)

(72) Inventor: Siying Yang, Cupertino, CA (US)

(73) Assignee: Shape Security, Inc., Mountain View, CA (US)

(*) Notice: Subject to any disclaimer, the term of this patent is extended or adjusted under 35 U.S.C. 154(b) by 0 days.

(21) Appl. No.: 14/481,835

(22) Filed: Sep. 9, 2014

(51) Int. Cl.
*H04L 29/06* (2006.01)
*G06F 21/54* (2013.01)

(52) U.S. Cl.
CPC .............. *H04L 63/168* (2013.01); *G06F 21/54* (2013.01); *H04L 63/1441* (2013.01); *H04L 63/1491* (2013.01)

(58) Field of Classification Search
CPC ............. H04L 63/168; H04L 63/1441; H04L 63/1491; G06F 21/54
See application file for complete search history.

(56) References Cited

U.S. PATENT DOCUMENTS

| | | | |
|---|---|---|---|
| 5,003,596 A | 3/1991 | Wood | |
| 5,315,657 A | 5/1994 | Abadi et al. | |
| 5,870,769 A | 2/1999 | Freund | |
| 5,987,611 A | 11/1999 | Freund | |
| 6,006,328 A | 12/1999 | Drake | |
| 6,170,020 B1 | 1/2001 | Blakeney | |
| 6,275,789 B1 | 8/2001 | Moser | |
| 6,401,077 B1 | 6/2002 | Godden | |
| 6,938,170 B1 * | 8/2005 | Kraft | G06F 17/3089 707/999.005 |
| 6,957,229 B1 | 10/2005 | Dyor | |
| 7,103,180 B1 | 9/2006 | McGregor | |
| 7,117,429 B2 | 10/2006 | Vedullapalli et al. | |
| 7,180,895 B2 | 2/2007 | Smith | |

(Continued)

FOREIGN PATENT DOCUMENTS

| | | |
|---|---|---|
| CN | 101471818 A | 7/2009 |
| CN | 101471818K2 | 5/2011 |

(Continued)

OTHER PUBLICATIONS w3schools.com, "Javascript Timing Events," pubished Dec. 31, 2013, accessed online @ [http://web.archive.org/web/20131231074905/http://w3schools.com/js/js_timing.asp] on Apr. 6, 2016.*

(Continued)

*Primary Examiner* — Robert Leung
(74) *Attorney, Agent, or Firm* — Hickman Palermo Becker Bingham LLP

(57) ABSTRACT

In an embodiment, a data processing system comprises one or more processors; script analysis logic coupled to the one or more processors and configured to obtain a particular electronic document from a server computer; script injection logic coupled to the one or more processors and configured to insert a set of script code into source code of the electronic document to result in producing a modified electronic document prior to providing the modified electronic document to a client computer; wherein the script code is configured to improve resistance of the client computer to attacks by running upon loading in the client computer and to cause transforming, when running in the client computer, one or more values of one or more elements of the source code of the electronic document into obfuscated values of the one or more elements. As a result, the system and method herein improve resistance of the client computer to attacks.

20 Claims, 9 Drawing Sheets

(56) References Cited

U.S. PATENT DOCUMENTS

| | | | |
|---|---|---|---|
| 7,500,099 B1 | 3/2009 | McElwee et al. | |
| 7,580,521 B1 | 8/2009 | Spies et al. | |
| 7,707,223 B2 | 4/2010 | Zubenko et al. | |
| 7,836,425 B2 | 11/2010 | Rubin et al. | |
| 7,895,653 B2 | 2/2011 | Calo et al. | |
| 7,940,657 B2 | 5/2011 | Perreault | |
| 7,961,879 B1 | 6/2011 | Spies et al. | |
| 7,975,308 B1 | 7/2011 | Satish et al. | |
| 8,020,193 B2 | 9/2011 | Bhola et al. | |
| 8,077,861 B2 | 12/2011 | Damgaard et al. | |
| 8,086,957 B2 | 12/2011 | Bauchot et al. | |
| 8,132,242 B1 | 3/2012 | Wu | |
| 8,170,020 B2 | 5/2012 | Oliver et al. | |
| 8,200,958 B2 | 6/2012 | Coppola et al. | |
| 8,220,054 B1 | 7/2012 | Lu | |
| 8,225,401 B2 | 7/2012 | Sobel et al. | |
| 8,266,202 B1 | 9/2012 | Colton et al. | |
| 8,266,243 B1 | 9/2012 | Carlson et al. | |
| 8,332,952 B2 | 12/2012 | Zhang et al. | |
| 8,346,966 B1 | 1/2013 | Phatak | |
| 8,516,080 B2 | 8/2013 | Chow | |
| 8,527,774 B2 | 9/2013 | Fallows et al. | |
| 8,533,480 B2 | 9/2013 | Pravetz et al. | |
| 8,548,998 B2 | 10/2013 | Plotnik | |
| 8,555,385 B1 | 10/2013 | Bhatkar et al. | |
| 8,555,388 B1 | 10/2013 | Wang et al. | |
| 8,584,233 B1 | 11/2013 | Yang | |
| 8,601,064 B1 | 12/2013 | Liao | |
| 8,627,479 B2 | 1/2014 | Wittenstein et al. | |
| 8,762,705 B2 | 6/2014 | He | |
| 8,788,805 B2 | 7/2014 | Herne | |
| 8,904,279 B1 * | 12/2014 | Bougon | H04L 67/02 705/51 |
| 8,954,583 B1 | 2/2015 | Zhou et al. | |
| 2002/0016918 A1 | 2/2002 | Tucker | |
| 2002/0188631 A1 | 12/2002 | Tiemann et al. | |
| 2003/0159063 A1 | 8/2003 | Apfelbaum et al. | |
| 2004/0101142 A1 | 5/2004 | Nasypny | |
| 2004/0162994 A1 | 8/2004 | Cohen | |
| 2004/0230889 A1 | 11/2004 | Ishiyama | |
| 2004/0245525 A1 | 12/2004 | Yamazaki et al. | |
| 2004/0249938 A1 | 12/2004 | Bunch | |
| 2005/0160161 A1 | 7/2005 | Barrett | |
| 2006/0015941 A1 | 1/2006 | McKenna | |
| 2006/0031855 A1 | 2/2006 | Smithline | |
| 2006/0034455 A1 | 2/2006 | Damgaard et al. | |
| 2006/0053295 A1 | 3/2006 | Madhusudan et al. | |
| 2006/0195588 A1 | 8/2006 | Pennington et al. | |
| 2007/0011295 A1 | 1/2007 | Hansen | |
| 2007/0064617 A1 | 3/2007 | Reves | |
| 2007/0074227 A1 | 3/2007 | Naidu et al. | |
| 2008/0025496 A1 | 1/2008 | Smith et al. | |
| 2008/0222736 A1 | 9/2008 | Bodaei et al. | |
| 2008/0229394 A1 | 9/2008 | Stering et al. | |
| 2008/0244078 A1 | 10/2008 | Vijuen et al. | |
| 2008/0250310 A1 | 10/2008 | Chen | |
| 2008/0320567 A1 | 12/2008 | Shulman | |
| 2008/0320586 A1 | 12/2008 | Hrabik et al. | |
| 2009/0007243 A1 | 1/2009 | Boodaei et al. | |
| 2009/0099988 A1 | 4/2009 | Stokes et al. | |
| 2009/0144829 A1 | 6/2009 | Grigsby et al. | |
| 2009/0193497 A1 | 7/2009 | Kikuchi | |
| 2009/0193513 A1 | 7/2009 | Agarwal et al. | |
| 2009/0241174 A1 | 9/2009 | Rajan et al. | |
| 2009/0249310 A1 | 10/2009 | Meijer et al. | |
| 2009/0282062 A1 | 11/2009 | Husic | |
| 2009/0292984 A1 | 11/2009 | Bauchot et al. | |
| 2010/0037150 A1 | 2/2010 | Sawant | |
| 2010/0083072 A1 | 4/2010 | Prasad et al. | |
| 2010/0100927 A1 | 4/2010 | Bhola et al. | |
| 2010/0115594 A1 | 5/2010 | Paya et al. | |
| 2010/0125612 A1 | 5/2010 | Amradkar et al. | |
| 2010/0131512 A1 | 5/2010 | Ben-Natan | |
| 2010/0172494 A1 | 7/2010 | Henson et al. | |
| 2010/0186089 A1 | 7/2010 | Fu et al. | |
| 2010/0235637 A1 | 9/2010 | Lu et al. | |
| 2010/0235910 A1 | 9/2010 | Ku et al. | |
| 2010/0257354 A1 | 10/2010 | Johnston et al. | |
| 2010/0262780 A1 | 10/2010 | Mahan | |
| 2010/0287132 A1 | 11/2010 | Hauser | |
| 2011/0015917 A1 | 1/2011 | Wang et al. | |
| 2011/0022846 A1 | 1/2011 | Ginter et al. | |
| 2011/0047169 A1 | 2/2011 | Leighton et al. | |
| 2011/0107077 A1 | 5/2011 | Henderson et al. | |
| 2011/0131416 A1 | 6/2011 | Schneider | |
| 2011/0154021 A1 | 6/2011 | McCann et al. | |
| 2011/0178973 A1 | 7/2011 | Lopez et al. | |
| 2011/0255689 A1 | 10/2011 | Bolotov et al. | |
| 2011/0283110 A1 | 11/2011 | Dapkus et al. | |
| 2011/0296391 A1 | 12/2011 | Gass et al. | |
| 2011/0302623 A1 | 12/2011 | Ricci | |
| 2011/0320816 A1 | 12/2011 | Yao et al. | |
| 2012/0011262 A1 | 1/2012 | Cheng et al. | |
| 2012/0022942 A1 | 1/2012 | Holloway et al. | |
| 2012/0023394 A1 | 1/2012 | Pieczul et al. | |
| 2012/0030248 A1 | 2/2012 | Blinnikka | |
| 2012/0059742 A1 | 3/2012 | Katzin et al. | |
| 2012/0096116 A1 | 4/2012 | Mislove et al. | |
| 2012/0124372 A1 | 5/2012 | Dilley et al. | |
| 2012/0173699 A1 | 7/2012 | Niemela | |
| 2012/0173870 A1 | 7/2012 | Reddy et al. | |
| 2012/0174225 A1 | 7/2012 | Shyamsunder | |
| 2012/0180021 A1 | 7/2012 | Byrd et al. | |
| 2012/0198528 A1 | 8/2012 | Baumhof | |
| 2012/0216251 A1 | 8/2012 | Kumar et al. | |
| 2012/0255006 A1 | 10/2012 | Aly | |
| 2013/0041986 A1 | 2/2013 | Colton et al. | |
| 2013/0091582 A1 | 4/2013 | Chen et al. | |
| 2013/0179981 A1 | 7/2013 | Bekker | |
| 2013/0198607 A1 | 8/2013 | Mischook et al. | |
| 2013/0219256 A1 | 8/2013 | Lloyd et al. | |
| 2013/0219492 A1 | 8/2013 | Call et al. | |
| 2013/0227397 A1 | 8/2013 | Tvorun et al. | |
| 2013/0232234 A1 | 9/2013 | Kapur et al. | |
| 2013/0263264 A1 | 10/2013 | Klein et al. | |
| 2013/0340043 A1 | 12/2013 | Zarei et al. | |
| 2014/0040787 A1 | 2/2014 | Mills et al. | |
| 2014/0053059 A1 | 2/2014 | Weber et al. | |
| 2014/0089786 A1 | 3/2014 | Hashmi | |
| 2014/0165197 A1 | 6/2014 | Ur | |
| 2014/0189499 A1 * | 7/2014 | Gigliotti | G06F 21/84 715/236 |
| 2014/0189808 A1 | 7/2014 | Mahaffey | |
| 2014/0223290 A1 * | 8/2014 | Hathaway | G06F 17/218 715/235 |
| 2014/0281535 A1 * | 9/2014 | Kane | H04L 63/0428 713/168 |
| 2014/0282872 A1 | 9/2014 | Hansen et al. | |
| 2014/0359571 A1 | 12/2014 | Sasikumar et al. | |
| 2015/0039962 A1 | 2/2015 | Fonseka et al. | |
| 2015/0067853 A1 | 3/2015 | Amrutkar | |
| 2015/0271188 A1 | 9/2015 | Call | |
| 2016/0028760 A1 | 1/2016 | Yang et al. | |
| 2016/0050231 A1 | 2/2016 | Varadarajan et al. | |
| 2016/0057111 A1 | 2/2016 | Call et al. | |
| 2016/0149953 A1 | 5/2016 | Hidayat et al. | |

FOREIGN PATENT DOCUMENTS

| | | | |
|---|---|---|---|
| GB | 2 443 093 | A | 4/2008 |
| GB | 2443093 | A | 4/2008 |
| WO | WO9964967 | A1 | 12/1999 |
| WO | WO00/72119 | A2 | 11/2000 |
| WO | WO02/093369 | A1 | 11/2002 |
| WO | WO02088951 | A1 | 11/2002 |
| WO | WO2004109532 | A1 | 12/2004 |
| WO | WO2008095018 | A2 | 8/2008 |
| WO | WO2008095031 | A1 | 8/2008 |
| WO | WO2008130946 | A2 | 10/2008 |
| WO | WO2010046314 | A1 | 4/2010 |

(56) References Cited

FOREIGN PATENT DOCUMENTS

| WO | WO2013091709 | 6/2013 |
|---|---|---|
| WO | WO2013091709 A1 | 6/2013 |

OTHER PUBLICATIONS

Rieck et al., "Cujo: Efficient Detection and Prevention of Drive-by-Download Attacks", ACSAC, Dated Dec. 2010, 9 pages.
Pattabiraman et al., "DoDOM: Leveraging DOM Invariants for Web 2.0 Application Robustness Testing" dated 2010, IEEE, 10 pages.
International Searching Authority, "Search Report" in application No. PCT/2014/027805, dated Aug. 14, 2014, 14 pages.
H. Krawczyk, "HMAC-Based Extract-and-Expand Key Derivation Function, (HKDF)", RFC 5869, IETF, May 2010, 10 pages.
Dougan et al., International Journal of Ambient Computing and Intelligence, dated Jan.-Mar. 2012, pp. 29-39.
D. Kristol, "HTTP State Management Mechanism", RFC 2965, IETF, dated Oct. 2000, 19 pages.
Currie et al., In-the-Wire Authentication: Protecting Client-Side Critical Data Fileds in Secure Network Transactions, dated 2009 2nd International Con. Adapt. Science & Tech. IEEE, pp. 232-237.
U.S. Appl. No. 14/321,172, filed Jul. 1, 2014, Office Action, Oct. 9, 2014.
European Patent Office, "Search Report" in application No. PCT/US2014/023635, dated Jan. 21, 2015, 11 pages.
U.S. Appl. No. 14/329,718, filed Jul. 11, 2014, Final Office Action, Feb. 20, 2015.
U.S. Appl. No. 14/055,714, filed Oct. 16, 2013, Office Action, Mar. 16, 2015.
U.S. Appl. No. 14/055,576, filed Oct. 16, 2013, Office Action, Feb. 26, 2015.
Li et al., "WebShield: Enabling Various Web Defense Techniques Without Client Side Modifications", dated Aug. 15, 2009, 18 pages.
European Patent Office in application No. PCT/US2014/068133, dated Apr. 7, 2015, 14 pages.
Claims in European Application No. PCT/US2014/068133, dated Apr. 2015, 16 pages.
International Searching Authority, "Search Report" in application No. PCT/US15/12072, dated Jan. 20, 2015, 14 pages.
Sedaghat et al., "On-The-Fly Web Content Integrity Check Boosts User's Confidence", Communications for the ACM, vol. 45, Issue 11, dated Nov. 2002, 5 pages.
Matsunaka et al., "Detecting and Preventing Drive-By Download Attack via Participative Monitoriing of the Web", Information Security, dated Jul. 26, 2013, 8th Asia Joint Conference, pp. 48-55.
European Patent Office, "Search Report" in application No. PCT/US2015/031361, dated Jul. 28, 2015, 13 pages.
U.S. Appl. No. 14/470,082, filed Aug. 27, 2014, Office Action, Aug. 28, 2015.
U.S. Appl. No. 14/286,324, filed May 23, 2014, Office Action, Aug. 31, 2015.
U.S. Appl. No. 14/009,437, filed Dec. 6, 2013, Notice of Allowance, Aug. 3, 2015.
U.S. Appl. No. 14/290,805, filed May 29, 2014, Notice of Allowance, Aug. 24, 2015.
U.S. Appl. No. 14/618,389, filed Feb. 10, 2015, Office Action, Oct. 5, 2015.
International Searching Authority, "Search Report" in application No. PCT/US2014/024232, dated Aug. 1, 2014, 52 pages.
International Searching Authority, "Search Report" in application No. PCT/2014/027805, dated Aug. 18, 2014, 14 pages.
International Searching Authority, "Search Report" in application No. PCT/2014/023897, dated Jul. 18, 2014, 15 pages.
U.S. Appl. No. 14/286,733, filed May 23, 2014, Office Action, Jul. 14, 2014.
RSA, "RSA Offers Advanced Solutions to Help Combat Man-In-The-Browser Attacks," rsa.com [online] May 18, 2010 [captured Nov. 11, 2011].
CodeSealer, "CodeSealer," codesealer.com [online] 2013 [captured Aug. 29, 2013]. Retrieved from the Internet: http://web.archive.org/web/2013082916503/http://codesealer.com/technology.html.
Cova et al., "Detection and Analysis of Drive-by-Download Attacks and Malicious JavaScript Code," World Wide Web Conference Committee, Apr. 26-30, 2010.
Egele et al., Defending Browsers against Drive-by Downloads: Mitigating Heap-spraying Code Injection Attacks, 2009.
Entrust, "Defeating Man-in-the-Browser Malware," Entrust.com [online] Sep. 2012 [retrieved Oct. 15, 2013]. Retrieved from the Internet: https://www.entrust.com/resource/defeating-man-in-the-browser-malware/.
Google Search, "Google Patents Search Results" dated May 21, 2014, 2 pages.
IP.com, "Search Results", Patents and Applications, http://ip/com/search/results.html, dated May 6, 2014, 2 pages.
Krebs on Security, In-depth security news and investigation, "A Closer Look at Rapport from Trusteer", dated Apr. 29, 2010.
Anderson et al., "Measuring the Cost of Cybercrime," 2012 Workshop on the Economics of Information Security (WEIS), [retrieved on Oct. 15, 2013].
Oh, "Recent Java exploitation trends and malware," Black Hat USA 2012.
Vasco, "Hardened Browser," vasco.com [online] [retrieved on Oct. 15, 2013]. Retrieved from the Internet: <URL: http://www.vasco.com/products/client_products/pki_digipass/hardened_browser.aspx>, 2 pages.
Rutkowska, "Rootkits vs. Stealth by Design Malware," Black Hat Europe, 2006.
SafeNet, "Prevent Financial Fraud and Man-in-the-Browser Attacks," safenet-inc.com [online] [retrieved on Oct. 15, 2013].
Sood and Enbody, "A Browser Malware Taxonomy," Virus Bulletin, Jun. 2011. Retrieved from the Internet: <URL:http://www.secniche.org/released/VB_BRW_MAL_TAX_AKS_RJE.pdf>, 5 pages.
Sood and Enbody, "Browser Exploit Packs—Exploitation Tactics," Virus Bulletin Conference, Oct. 2011.
Sood et al., "The Art of Stealing Banking Information—Form grabbing on Fire," Virus Bulletin, Nov. 2011.
Team Cymru, "Cybercrime—an Epidemic," Queue, 4(9):24-35, Nov. 2006, Retrieved from the Internet: http://queue.acm.org/detail.cfm?id=1180190.
Trusteer, "Trusteer Rapport", "Endpoint-centric Fraud Prevention", from the web http://www.trusteer.com/products/trusteer-rapport, last accessed on Jan. 9, 2013, 2 pages.
USPTO, Office Action in U.S. Appl. No. 14/286,733, notified Jul. 14, 2014, 17 pages.
Marcus and Sherstobitoff, "Dissecting Operation High Roller," McAfee [online] 2012 [retrieved on Oct. 15, 2013]. Retrieved from the Internet:http://www.mcafee.com/tw/resources/reports/rp-operation-high-roller.pdf.
U.S. Appl. No. 14/286,733, filed May 23, 2014, Office Action, May 27, 2015.
U.S. Appl. No. 14/055,704, filed Oct. 16, 2013, Interview Summary, Apr. 9, 2015.
U.S. Appl. No. 14/055,704, filed Oct. 16, 2013, Final Office Action, Apr. 9, 2015.
International Searching Authority, "Search Report" in application No. PCT/US2015/049024, dated Jan. 19, 2016, 10 pages.
Claims in application No. PCT/US2015/049024, dated Jan. 2016, 8 pages.
Wikipedia Online, "List of HTTP Header Fields", dated Jun. 18, 2014, Retreived from internet https://en.wikipedia/org/w/index.php?title=List of HTTP_header_fields&oldid=613421878>, 11 pages.
Shackleford, D. "Application Whitelisting: Enhancing Host Security," SANS Institute Reading Room, Oct. 2009, 16 pages.
Indiana University [online]. "Authentication vs. Authorization," published before Jul. 1, 2014, Internet: <URL: https://protect.iu.edu/cybersecurity/authn-authz>. 2 pages.
Hueniverse Online, "Introduction" published before Jul. 1, 2014, retrieved on Jul. 1, 2014 from the internet http://huniverse.com/oauth/guide/into>4pages.

(56) References Cited

OTHER PUBLICATIONS

D Hardt, "The Oauth 2.0 Authorization Framework", Internet Engineering Task Force, dated Oct. 2012, 76 pages.

Boston University Information Services & Technology [online]. "Understanding Authentication, Authorization, and Encryption," www.bu.edu/tech/services/security/resources/bestpractice/auth, Jul. 2014 4pgs.

U.S. Appl. No. 14/968,460, filed Dec. 14, 2015, Office Action, Apr. 8, 2016.

U.S. Appl. No. 14/679,596, filed Apr. 6, 2015, Final Office Action, Mar. 30, 2016.

U.S. Appl. No. 14/618,389, filed Feb. 10, 2015, Notice of Allowance, Mar. 16, 2016.

U.S. Appl. No. 14/618,389, filed Feb. 10, 2015, Supplemental Notice of Allowability, Apr. 12, 2016.

U.S. Appl. No. 14/602,038, filed Jan. 21, 2015, Office Action, Apr. 22, 2016.

U.S. Appl. No. 14/570,466, filed Dec. 15, 2014, Office Action, Apr. 21, 2016.

U.S. Appl. No. 14/481,867, filed Sep. 9, 2014, Office Action, Apr. 8, 2016.

U.S. Appl. No. 14/286,324, filed May 23, 2014, Final Office Action, Apr. 20, 2016.

The International Bureau of WIPO, "International Preliminary Report on Patentability" in application No. PCT/US2014/068133, dated Jun. 21, 2016, 12 pages. Claims in application No. PCT/US2014/068133, dated Jun. 2016, 16 pages.

U.S. Appl. No. 14/702,140, filed May 1, 2015, Final Office Action, May 19, 2016.

U.S. Appl. No. 14/329,718, filed Jul. 11, 2014, Final Office Action, May 6, 2016.

\* cited by examiner

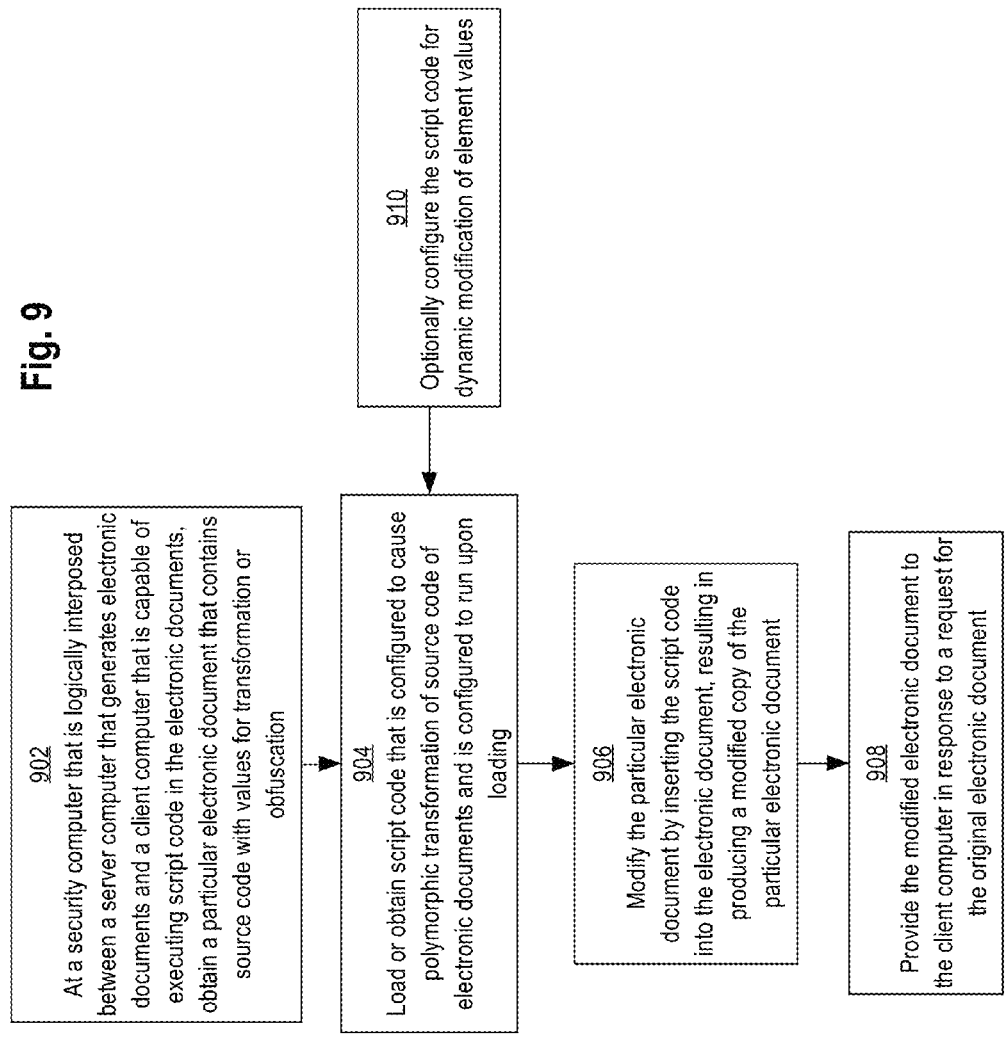

MITIGATING SCRIPTED ATTACKS USING DYNAMIC POLYMORPHISM

FIELD OF THE DISCLOSURE

The present disclosure generally relates to security techniques applicable to client/server systems, and relates more specifically to techniques for improving the resistance of client computers to attacks carried in browser-executed script code. SUGGESTED GROUP ART UNIT: 2447; SUGGESTED CLASSIFICATION: 709/217.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Browsers are powerful computer program applications that may request and execute instructions received from a web server to generate complex user interfaces that are presented to a user through one or more devices, such as a monitor or speakers. In response to input from a user, such as a mouse click indicating that the user selected a link, a browser may send a request based on the selected link to the web server. The request may be a request for data and/or include data to be processed by the web server.

A malicious user may use software, often referred to as a "bot", which imitates a browser by receiving instructions from a web server and generating requests based on those instructions. For example, a bot may receive a web page, and generate a request based on a link defined in the web page, as if the link was selected by a user. Also for example, a bot generate and send a request with data assigned to one or more parameters to simulate a user submitting data to a web server through a browser.

Malicious users may use bots to commit many types of unauthorized acts, crimes or computer fraud, such as content scraping, ratings manipulation, fake account creation, reserving rival goods attacks, ballot stuffing attacks, password snooping, web site scraping attacks, vulnerability assessments, and stack fingerprinting attacks. As a specific example, a malicious user may cause a bot to traverse through pages of a web site and collect private and/or proprietary data, such as who is connected with whom on a particular social networking web site.

Web server administrators may wish to prevent malicious users from attacking the site, while allowing legitimate users to use the site as intended. However, determining which requests are generated by a legitimate user using a web browser and a malicious user using a bot may be difficult.

Many presently implemented websites are vulnerable to attacks that are carried in browser-executed script code, such as Selenium, Sikuli and PhantomJS, in part because the HTML source code is readable by any browser user who invokes the VIEW SOURCE or INSPECT ELEMENT commands of the browser. Adversaries can write brief scripts which, when executed on an end user computer using the browser, can access static HTML elements such as form fields and embedded URLs to launch sophisticated attacks. These malicious scripts can generate protocol-compliant network traffic that appears legitimate to most existing security products, including firewalls, intrusion protection systems, and web application firewalls. Differentiating malicious scripts from legitimate human users is difficult.

One approach to computer security introduces static real-time polymorphism to web pages by transforming HTML form field attributes, such as field names and identifiers, to randomized string values. A "botwall" implementing this technique will change the form field name an ID for each client access to the same web page. This approach is effective to defeat malicious scripts that rely on static form field attributes. However, because the form field transformation does not change once the web content is delivered to the browser—that is, the polymorphism here is static—using a sufficient amount of reverse engineering effort, malicious users may be able to understand how the polymorphism was implemented and attempt to evade it.

SUMMARY

The appended claims may serve as a summary of the invention.

BRIEF DESCRIPTION OF THE DRAWINGS

In the drawings:

FIG. 9 illustrates a computer-implemented process of using dynamic polymorphism to improve resistance to attacks embodied in script code.

Figure 1:
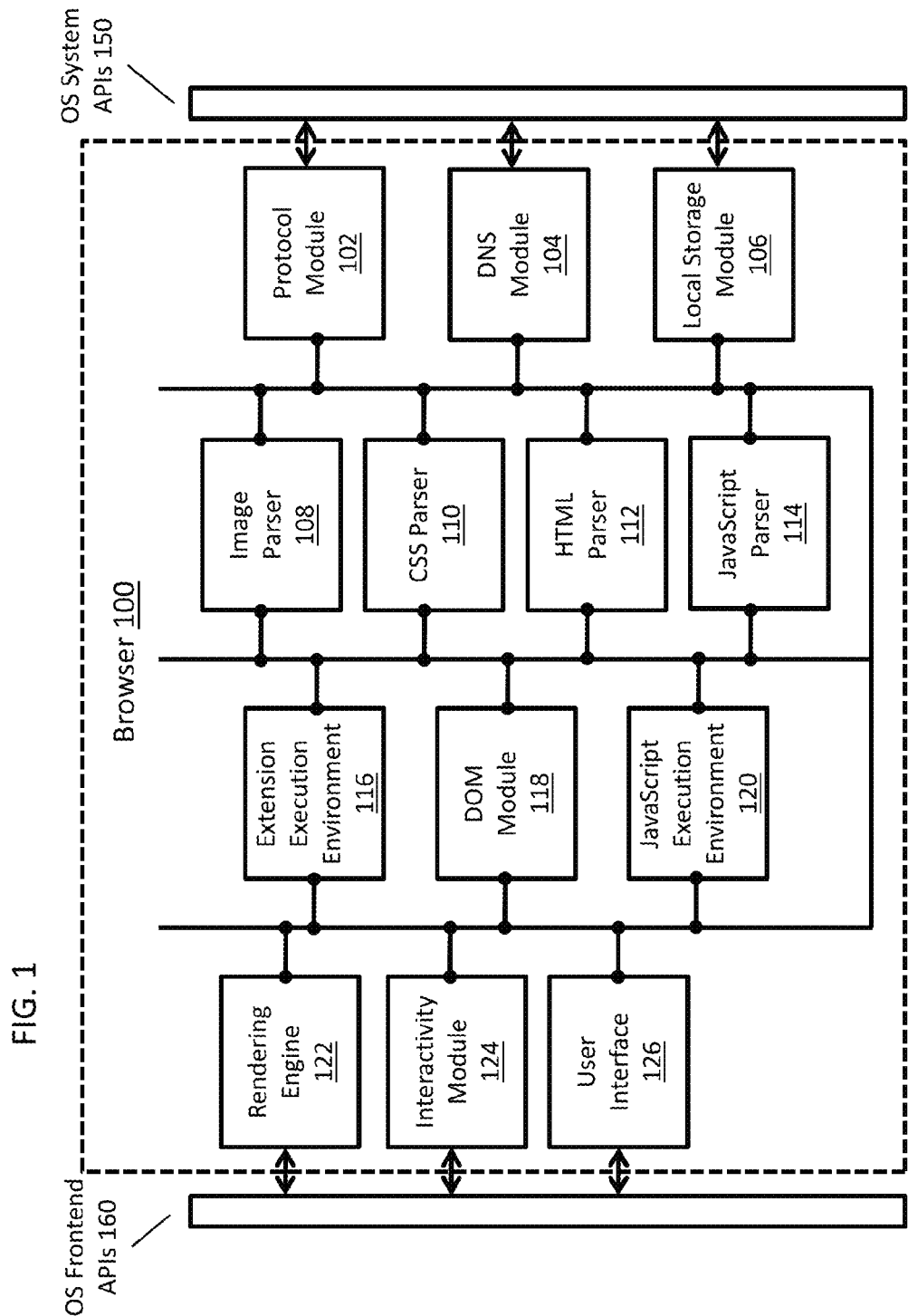
FIG. 1 illustrates functional units of a web browser.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments. For example, intermediary computer 230 in FIG. 2 may be described with reference to several components illustrated in FIG. 3 and discussed in detail below, but using the particular arrangement illustrated in FIG. 3 is not required in other embodiments. Furthermore, while the instructions discussed in many example embodiments are HTML, JavaScript, and CSS instructions, in other embodiments, the instructions intercepted and generated may be any other standard and/or proprietary instructions configured to be executed by a client computer.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Differences Between Browsers and Bots
    2.1 Example Browser Anatomy
    2.2 Example Bot Anatomy
3.0 Network Topology
    3.1 Web Infrastructure
    3.2 Intermediary Computer
    3.3 Browser
4.0 Process Overview—Credential-Morphing
    4.1 Intercepting Instructions from a Content Server Computer
    4.2 Modifying Instructions which Causes a Browser to Submit a Credential with One or More Requests
    4.3 Rendering a Second Set of Instructions Comprising Credential-Morphing-instructions
    4.4 Sending the Modified and Credential-Morphing-instructions to the Client Computer
    4.5 Updating the Credential Over Time
    4.6 Validating a Credential
    4.7 Generating a New Credential
    4.8 Sending a New Credential
    4.9 Updating a Credential Over Time
    4.10 Validating a Request for Data
    4.11 Performing a Negative Responsive Action
    4.12 Forwarding the Request to a Server Computer
5.0 Process Overview—Dynamic Polymorphism for Script Code
    5.1 Example Computing Topology
    5.2 Example Process Flow
6.0 Implementation Mechanisms—Hardware Overview
7.0 Other Aspects of Disclosure 1.0 General Overview In an embodiment, a data processing system comprises one or more processors; script analysis logic coupled to the one or more processors and configured to obtain a particular electronic document from a server computer; script injection logic coupled to the one or more processors and configured to insert a set of script code into source code of the electronic document to result in producing a modified electronic document prior to providing the modified electronic document to a client computer; wherein the script code is configured to improve resistance of the client computer to attacks by running upon loading in the client computer and to cause transforming, when running in the client computer, one or more values of one or more elements of the source code of the electronic document into obfuscated values of the one or more elements.

The script code may be configured to cause the transforming using a pseudo-random transformation of the values of the elements. The script code may comprise two or more segments of a particular obfuscated value, and the script code may be configured to cause transforming a particular value of a particular element of the source code into a particular combination of the two or more segments. The script code may be configured to cause transforming the particular value of the particular element of the source code into a pseudo-randomly selected combination of the two or more segments. The script code may be configured to cause transforming the particular value of the particular element of the source code into a randomly selected combination of the two or more segments.

The script code may be configured to repeatedly periodically execute in the client computer, and wherein the script code is configured to cause the transforming in a different manner at each time that the script code repeatedly periodically executes in the client computer. The script code may be configured to repeatedly periodically execute in the client computer at time intervals specified using a time interval value in the script code, and wherein the script injection logic is configured to periodically update the time interval value in the script code to a different time interval value.

In an embodiment, a data processing method comprises obtaining a particular electronic document from a server computer; inserting a set of script code into source code of the electronic document to result in producing a modified electronic document; providing the modified electronic document to a client computer; the script code may be configured to improve resistance of the client computer to attacks by running upon loading in the client computer and to cause transforming, when running in the client computer, one or more values of one or more elements of the source code of the electronic document into obfuscated values of the one or more elements.

2.0 Differences Between Browsers and Bots

A web browser may be a tool through which application programs can provide client computers with content in a dynamic, custom UI. For example, in response to receiving a request for data from a web browser, a web server responds with a set of instructions and/or data. The instructions may define one or more objects that include data and/or other objects. The instructions may also define how the data and/or objects may be presented in a UI to enable human/computer interaction.

In contrast, bots traverse web pages and/or web sites to retrieve data from, and/or submit data to, one or more web servers with little, if any, human/computer interaction. For example, in response to receiving a request for data from a bot, a web server responds with a set of instructions. As discussed above, the instructions may define one or more objects that include data and/or other objects. The instructions may also define how the data and/or objects may be presented in a UI. However, a bot may parse the instructions looking for particular data to store and/or use to make subsequent requests. A bot need not execute the instructions because the bot is built to operate with little, if any, human/computer interaction. The bot may simply look for data by parsing the one or more data structures defined in the instructions. Thus, a bot may be a functionally-limited browser.

A server computer that requires a browser to use one or more parsers and/or execution environments may filter out requests from bots. For purposes of illustrating a clear example, assume a browser includes a JavaScript parser or JavaScript execution engine, and a bot does not include a JavaScript parser or JavaScript execution engine. Also assume that a server computer may include one or more JavaScript instructions in a web page, which if executed, may cause a browser to request, receive, generate, and/or update a dynamic credential. A dynamic credential may be a credential that is updated over time. Accordingly, the browser may parse and execute the one or more JavaScript instructions, which cause the browser to request, receive, generate, and/or update the credential over time and include a valid dynamic credential in a subsequent request.

In contrast, a bot, which does not include a JavaScript parser and/or JavaScript execution environment, may not request, receive, generate, and/or update the dynamic credential over time. Thus, the bot may not include a valid dynamic credential in a subsequent request.

If a server computer receives a request for a web page with a valid dynamic credential from a browser, then the server computer may send the requested web page to the browser. However, if the server computer receives a request without a valid dynamic credential from the bot, then the server computer may perform a negative action, such as terminating the request or ignoring one or more future requests from the bot.

2.1 Example Browser Anatomy

FIG. 1 illustrates functional units of a web browser. Browser 100 may be a browser that is executed on a personal computer, used to communicate with or otherwise conceptually visit a web server, and operated by a user using the personal computer. Browser 100 is communicatively coupled with operating system ("OS") system application programming interface ("API") layer 150 and OS frontend API layer 160. Other embodiments may use other protocols, modules, and/or parsers.

Browser 100 comprises protocol module 102, domain name server ("DNS") module 104, local storage module 106, image parser 108, CSS parser 110, HTML parser 112, JavaScript parser 114, extension execution environment 116, document object model ("DOM") module 118, and JavaScript execution environment 120. Protocol module 102, DNS module 104, and local storage module 106 may send and/or receive data through OS System API layer 150. For example, protocol module 102 may send and/or receive data over any protocol, such as HTTP, to/from a server computer through OS system API layer 150. Data received through protocol module 102 may reference data sources by one or more domain names. DNS module 104 may resolve the one or more domain names referenced by interfacing with one or more remote domain name servers through OS system API layer 150. Local storage module may store and/or recall data from memory through OS system API layer 150.

Image parser 108, CSS Parser 110, HTML parser 112, and JavaScript parser 114 may parse data received through protocol module 102. HTML parser 112 may parse HTML data. CSS parser 110 may parse CSS data. JavaScript parser 114 may parse JavaScript data. Image parser 108 may parse image data. Each parser may generate and/or update objects in a DOM maintained by DOM module 118.

Browser 100 may comprise sets of program logic implementing one or more programmable engines, such as extension execution environment 116 and JavaScript execution environment 120. Extensions may be written one or more programming languages include JavaScript, Python, Ruby, and/or any other language. Each programmable engine may have access to DOM module 118 and may operate on one or more objects from a DOM maintained by DOM module 118. For example, JavaScript execution environment 120 may execute JavaScript parsed by JavaScript parser 114 and in response, create, update, and/or delete one or more objects managed by DOM module 118, and/or one or more aspects of a UI presenting the one or more objects.

Browser 100 comprises rendering engine 122, interactivity module 124, and user interface 126. Each of the components may cause, through OS frontend API layer 160, one or more objects to be presented to a user using a client computer. Rendering engine 122 may determine how objects are presented to a user. For example, rendering engine 122 may determine the color, shape, orientation, position, and/or any other visual and/or audio attribute of an image, text field, button, and/or any other object defined by a set of received instructions. Furthermore, rendering engine 122 may cause a button to be displayed on a monitor coupled to a client computer through OS frontend API layer 160.

User interface 126 may determine what may be presented to a user. For example, user interface 126 may determine that a "submit" button should be hidden until data has been entered in one or more text fields. After data has been entered in the one or more text fields, user interface 126 may notify rendering engine 122 to render the "submit" button accordingly.

Interactivity module 124 may receive one or more inputs through OS Frontend API layer 160. For example, in response to a user pressing a button on a mouse coupled to a client computer 299, the OS running on the client computer may send a message to interactivity module 124, through OS frontend API layer 160, to indicate that a user pressed a button on a mouse. Interactivity module 124 may determine that a user selected a particular button currently presented on a monitor. Interactively module 124 may notify user interface 126 and/or rendering engine 122 to update to update the UI accordingly.

2.2 Example Bot Anatomy

A bot may include a subset of the modules and/or features included in browser 100. For example, a bot may include protocol module 102, DNS module 104, local storage module 106, and HTML parser 112. A bot need not support a UI; thus, a bot need not include rendering engine 122, interactivity module 124, and user interface 126.

To increase processing time and speed of development, a bot need not include one or more parsers and/or execution environments. For example, a bot may be configured to look for data embedded in a DOM defined in one or more HTML documents. Therefore, a bot may include an HTML parser. However, a bot need not include one or more parsers or execution environments, such as image parser 108, CSS parser 110, JavaScript parser 114, extension execution environment 116, and/or JavaScript execution environment 120.

3.0 Network Topology

Figure 2:
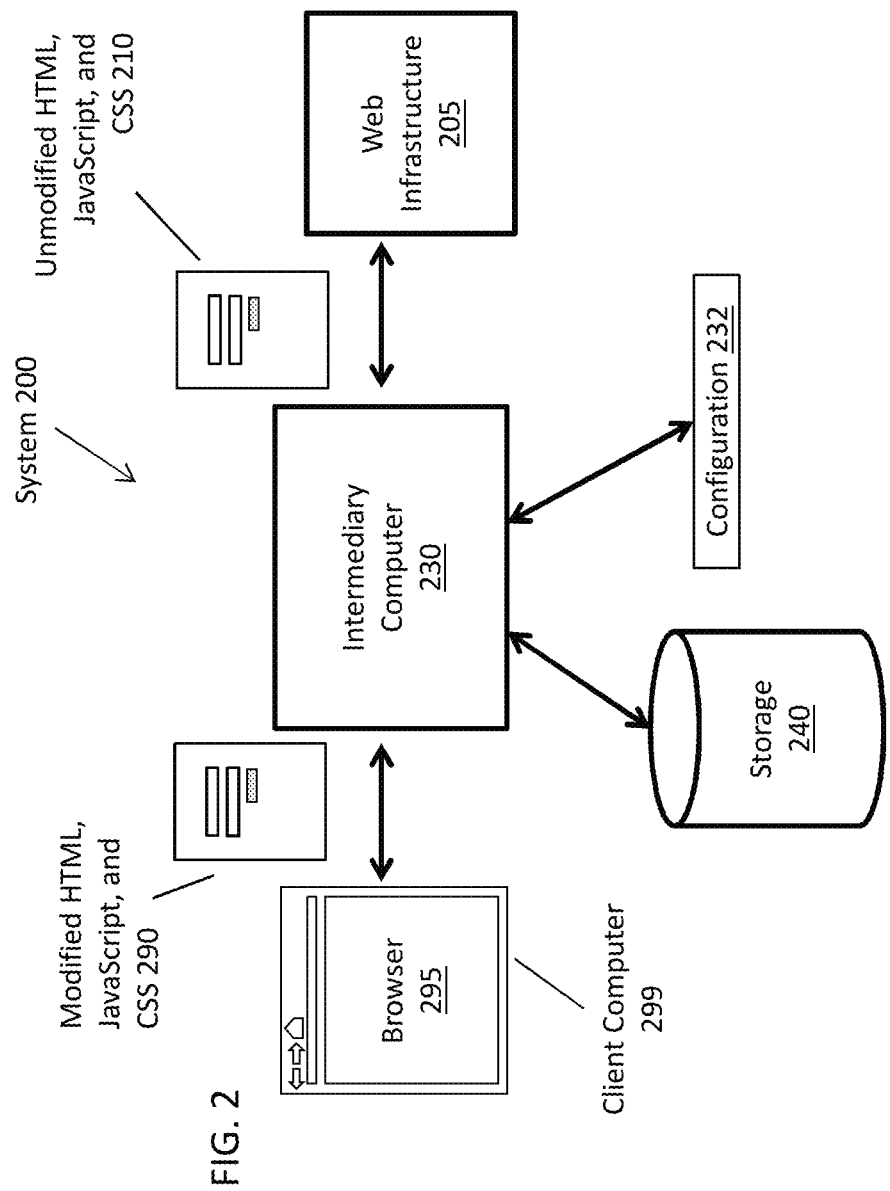
FIG. 2 illustrates a computer system comprising a browser, an intermediary computer, and a web infrastructure in an example embodiment.
Figure 3:
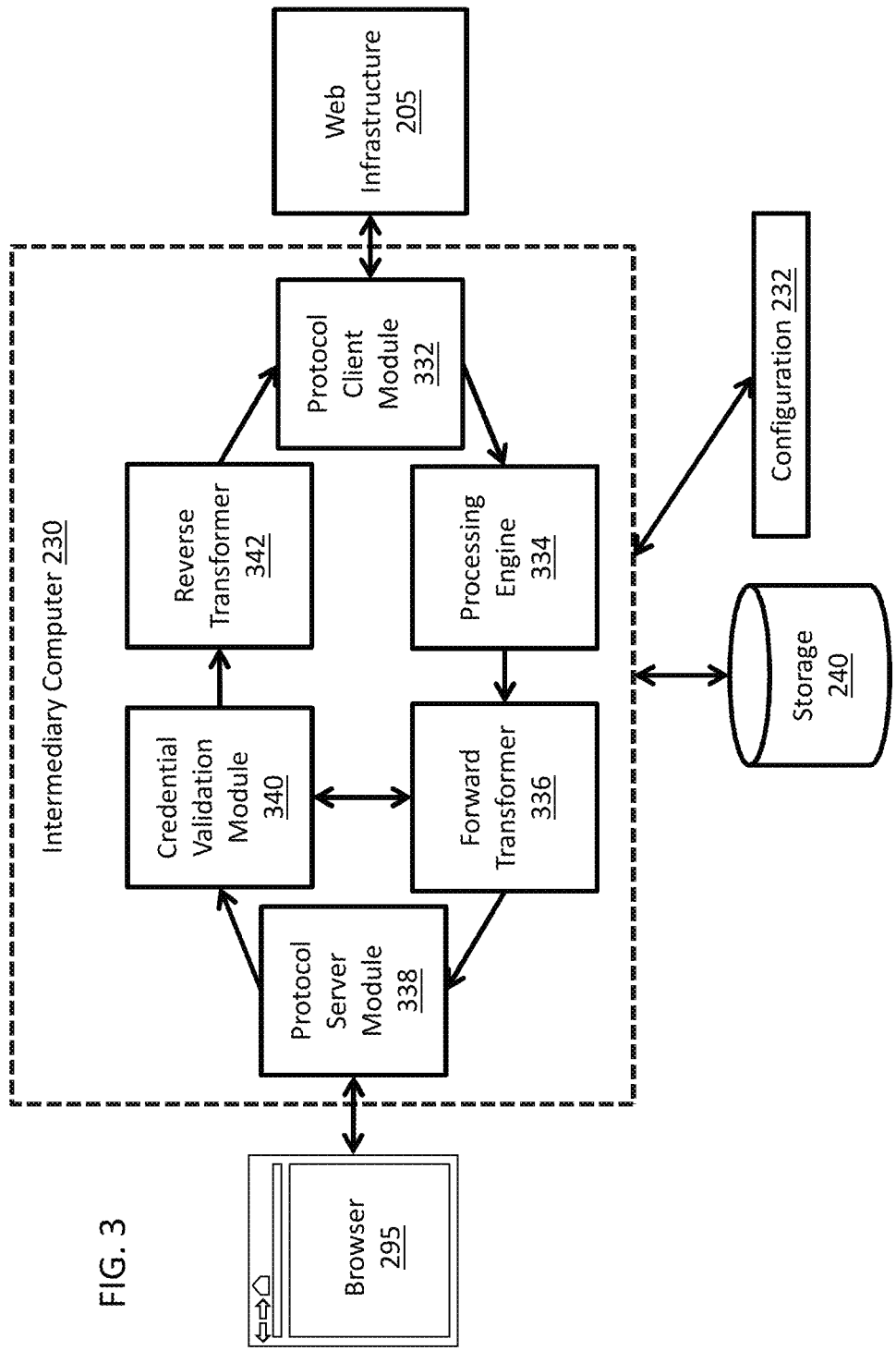
FIG. 3 illustrates detailed view of an intermediary computer in an example embodiment.

FIG. 2 illustrates a computer system comprising a browser, an intermediary computer, and a web infrastructure in an example embodiment. Referring first to FIG. 2, system 200 includes web infrastructure 205, client computer 299, intermediary computer 230, storage 240, and configuration 232 distributed across a plurality of interconnected networks.

While each of the components listed above is illustrated as if running on a separate, remote computer from each other, one or more of the components listed above may be part of and/or executed on the same computer. For example, intermediary computer 230, configuration 232, storage 240, and/or web infrastructure 205 may be executed on the same computer, local area, and/or wide area network. Additionally or alternatively, intermediary computer 230 may be a proxy server and/or layer for web infrastructure 205. Additionally or alternatively, intermediary computer 230 may be in line between a router and web infrastructure 205, such that intermediary computer 230 may intercept all network data sent to, and/or sent from, web infrastructure 205 over one or more protocols. Additionally or alternatively, intermediary computer 230, and/or one or more modules comprising intermediary computer 230 discussed herein, may be a software layer between, and/or executed on, web infrastructure 205 and/or a component of web infrastructure 205. Additionally or alternatively, intermediary computer 230, and/or one or more modules comprising intermediary computer 230 discussed herein, may be part of a server-side application that responds to requests over one or more standard and/or proprietary protocols, such as HTTP and/or any other protocol.

3.1 Web Infrastructure

Web infrastructure 205 may comprise one or more server computers that receive requests for data from users through one or more computers, such as client computer 299 and/or intermediary computer 230. Web infrastructure 205 may respond by sending data to the browser that sent the request. As illustrated in FIG. 2, the data sent from web infrastructure 205 may include instructions: HTML, JavaScript, and CSS 210. The one or more computers in web infrastructure 205 may, but need not, be owned and/or managed by one or more independent entities and may span across one or more computer networks.

A server computer may be a computer that receives requests for data and responds with data. For example, a web server computer may be an HTTP-based computer that receives HTTP requests and responds with data comprising HTML, CSS, and/or JavaScript instructions. Additionally or alternatively, a server computer may respond with data that references data on other server computers in, and/or outside of, web infrastructure 205.

3.2 Intermediary Computer

Intermediary computer 230 may be an intermediary that may intercept instructions sent from web infrastructure 205, parse and/or execute one or more of the intercepted instructions, modify the intercepted instructions, generate and/or add new instructions, and send the modified and/or new instructions to a client computer. For example, intermediary computer 230 may intercept HTML, JavaScript, and CSS 210, generate modified HTML, JavaScript, and CSS 290, and send modified HTML, JavaScript, and CSS 290 to browser 295. Intermediary computer 230 may intercept a request from browser 295, generate a new and/or modified request, and send the new and/or modified request to web infrastructure 205.

Intermediary computer 230 may be an HTTP or SPDY intermediary that intercepts, parses, executes, and/or processes HTML, JavaScript, and CSS instructions. Additionally or alternatively, intermediary computer 230 may intercept requests for data and/or instructions from a client application, generate a new HTTP request, and send the newly generated HTTP request to one or more HTTP and/or SPDY-based web servers. Additionally or alternatively, intermediary computer 230 may be an intermediary for any other standard and/or proprietary protocol. Furthermore, each of the components discussed herein, which intermediary computer 230 is comprised of, may be configured to perform any of the processes and/or methods discussed herein for any standard and/or proprietary protocol.

Intermediary computer 230 may be a server computer that one or more domain name servers or other elements of the domain name system ("DNS") identify in DNS records as a destination network address associated with one or more internet domain names. Accordingly, intermediary computer 230 and/or intermediary computer 230 may receive requests sent to the one or more domains from a browser or bot. Based on using DNS to resolve the domain name in a request to a network address, intermediary computer 230 may forward the request, or a modified request, to a server computer in web infrastructure 205, such as original web server computer 302.

In FIG. 2, intermediary computer 230 is programmed to send instructions to, and receive requests from, a particular type of client application: browser 295. However, in an embodiment, intermediary computer 230 may be programmed to send instructions to, receive requests from, and/or open sockets with browsers and/or bots.

FIG. 3 illustrates detailed view of an intermediary computer in an example embodiment. In FIG. 3, intermediary computer 230 comprises protocol client module 332, processing engine 334, forward transformer 336, protocol server module 338, credential validation module 340, and reverse transformer 342. In an embodiment, each of the functional units of intermediary computer 230 may be implemented using any of the techniques further described herein in connection with FIG. 7; for example, the intermediary computer 230 may comprise a general-purpose computer configured with one or more stored programs which when executed cause performing the functions described herein for the intermediary computer, or a special-purpose computer with digital logic that is configured to execute the functions, or digital logic that is used in other computing devices. While the figures include lines that indicate various devices and/or modules being communicatively coupled, each of the computers, devices, modules, storage, and configurations may be communicatively coupled with each other.

3.2.1 Protocol Client Module

Protocol client module 332 may intercept data over any standard or proprietary protocol. For example, protocol client module 332 may intercept data over HTTP.

3.2.2 Processing Engine

Processing engine 334 may process instructions intercepted by protocol client module 332, which causes processing engine 334 to generate one or more data structures. Processing one or more instructions may comprise parsing and/or executing the one or more instructions. After processing the instructions, processing engine 334 may notify forward transformer 336 to begin rendering instructions based on the one or more data structures created by processing engine 334 that are currently in memory.

Processing engine 334 may make requests for additional data. For example, if instructions received from protocol client module 332 reference additional instructions stored on another web server, then processing engine 334 may request the additional instructions through protocol client module 332.

3.2.3 Forward Transformer

Forward transformer 336 may render a new set of instructions based on the one or more data structures in memory. Additionally or alternatively, forward transformer 336 may operate on the objects created by processing engine 334 and generate one or more credential-morphing-instructions, which if executed are configured to cause a browser to request, receive, generate, and/or update one or more dynamic credentials. Forward transformer 336 may store the one or more dynamic credentials and/or data associated with one or more dynamic credentials in storage 240. Forward transformer 336 may operate on objects and/or render instructions based on one or more configurations specified in configuration 232. Forward transformer 336 may send the rendered instructions to one or more client computers through protocol server module 338.

3.2.4 Protocol Server Module

Protocol server module 338 may receive the instructions generated by forward transformer 336 and send the generated instructions to client computer 299. Additionally or alternatively, protocol server module 338 may intercept requests from client computer 299 and forward the requests to credential validation module 340.

3.2.5 Credential Validation Module

Credential validation module 340 may receive requests intercepted by protocol server module 338 from browser 295. Credential validation module 340 may validate requests and/or credentials, and forward the requests for one or more pages to reverse transformer 342.

Credential validation module 340 may generate one or more dynamic credentials. For example, forward transformer 336 may render a page and embed a dynamic credential received from credential validation module 340 into the page. Also for example, in response to a request from a client computer for a dynamic credential, credential validation module 340 may generate a new, valid dynamic credential and send the new dynamic credential to the client computer through protocol server module 338.

Credential validation module 340 may generate one or more parameters associated with dynamic credential. For example, credential validation module 340 may store a credential, a timestamp, and an Internet Protocol ("IP") address in storage 240. As discussed in detail herein, credential validation module 340 may validate a request with the stored credential based on the timestamp and the IP address associated with the stored credential.

Credential validation module 340 may authorize requests based on configuration 232. For purposes of illustrating a clear example, assume that configuration 232 includes data indicating that a particular web page is public. In response to a request for the particular web page, which does not include a dynamic credential, credential validation module 340 may authorize the request based on configuration 232.

3.2.6 Reverse Transformer

Reverse transformer 342 may translate requests intercepted by protocol server module 338, which are based on instructions generated by forward transformer 336, into requests that would have been generated by browser 295 had browser 295 received the original instructions sent from web infrastructure 205. For example, if a request from browser 295 includes a dynamic credential generated by credential validation module 340, then reverse transformer 342 may generate a new request that does not include the dynamic credential. Reverse transformer 342 may send the new request web infrastructure 205 through protocol client module 332 on behalf of browser 295.

3.2.7 Configurations

Configuration 242 may be a database, a configuration file, and/or any other system that stores configurations: settings, preferences, and/or protocols. Configuration 242 may store more than one configuration for one or more web servers in web infrastructure 205. For example, configuration 232 may include data that indicates requests to a particular server computer in web infrastructure 205 need not be validated. Additionally or alternatively, configuration 232 may include data that indicates requests for a particular web page need not be validated. Additionally or alternatively, configuration 232 may include data that indicates requests to submit data to a particular web site need not be validated. Also for example, configuration 232 may include data that indicates whether particular web pages should be processed by processing engine 334 and/or modified by forward transformer 336.

Configuration 232 may be modified by a user and/or administrator through one or more computers, such intermediary computer 230, a computer in web infrastructure 205, and/or any other computer. The one or more computers may present the user with an interface that presents the user with a site map. The site map may comprise a graph, wherein the nodes correspond to pages and the edges between the nodes correspond to links.

The user may update configuration 232, through the interface, by selecting which links and/or pages to be "public" (do not require a valid credential) and which links and/or pages are "private" (require a valid credential). For example, the interface may receive input from a user indicating that a page is public. Configuration 232 may be updated accordingly. When a request is received for the particular page, even if the request does not have a valid credential, intermediary computer 230 may pass the request to web infrastructure 205. Also for example, the interface may receive input from a user indicating that a link, with a particular link identifier, is public. When intermediary computer 230 receives a request that includes a particular link identifier, then intermediary computer 230 may pass the request to web infrastructure 205 even if the request does not have a valid credential.

3.2.8 Storage

Storage 240 may be a database, a configuration file, and/or any other system and/or data structure that stores data. In FIG. 2, storage 240 is illustrated as if a separate computer from intermediary computer 230. Additionally or alternatively, storage 240 may be a data structure stored in memory on the one or more computers comprising intermediary computer 230. Additionally or alternatively, storage 240 may, at least in part, be a data structure stored in shared memory between one or more intermediary computers. Additionally or alternatively, intermediary computer 230 may, at least in part, be stored in volatile and/or non-volatile memory.

3.3 Browser

Browser 295 may be a browser as described herein and executed on a client computer, such as client computer 299. Additionally or alternatively, browser 295 may be a bot comprising one or more of the components traditionally found in a browser.

4.0 Process Overview

In an embodiment, a data processing method may be configured to intercept instructions from a server computer that are directed toward a browser, modify the intercepted instructions, include one or more credential-morphing-instructions, render a second set of instructions comprising the modified set of instructions and one or more credential-morphing-instructions. In an embodiment, a data processing method may be configured to receive requests from a browser for a new credential from a client application, validate the request using a previous credential, generate the new credential, and send the new credential to the browser. In an embodiment, a data processing method may be configured to receive requests from a client computer for data on a server computer, validate the request based on a dynamic credential. In an embodiment, if the request is valid, then the processing method may be configured to modify the request, send the modified request to a server computer, receive data from the server computer in response to the modified request, and/or send a response to a client computer. Various embodiments may use standard web protocols, such as HTTP, and/or standard web-based instructions, such as HTML, CSS, and/or JavaScript. Additionally or alternatively, other standard and/or proprietary protocols may be used. Additionally or alternatively, other standard and/or proprietary instructions may be used.

4.1 Intercepting Instructions from a Content Server Computer

Figure 4:
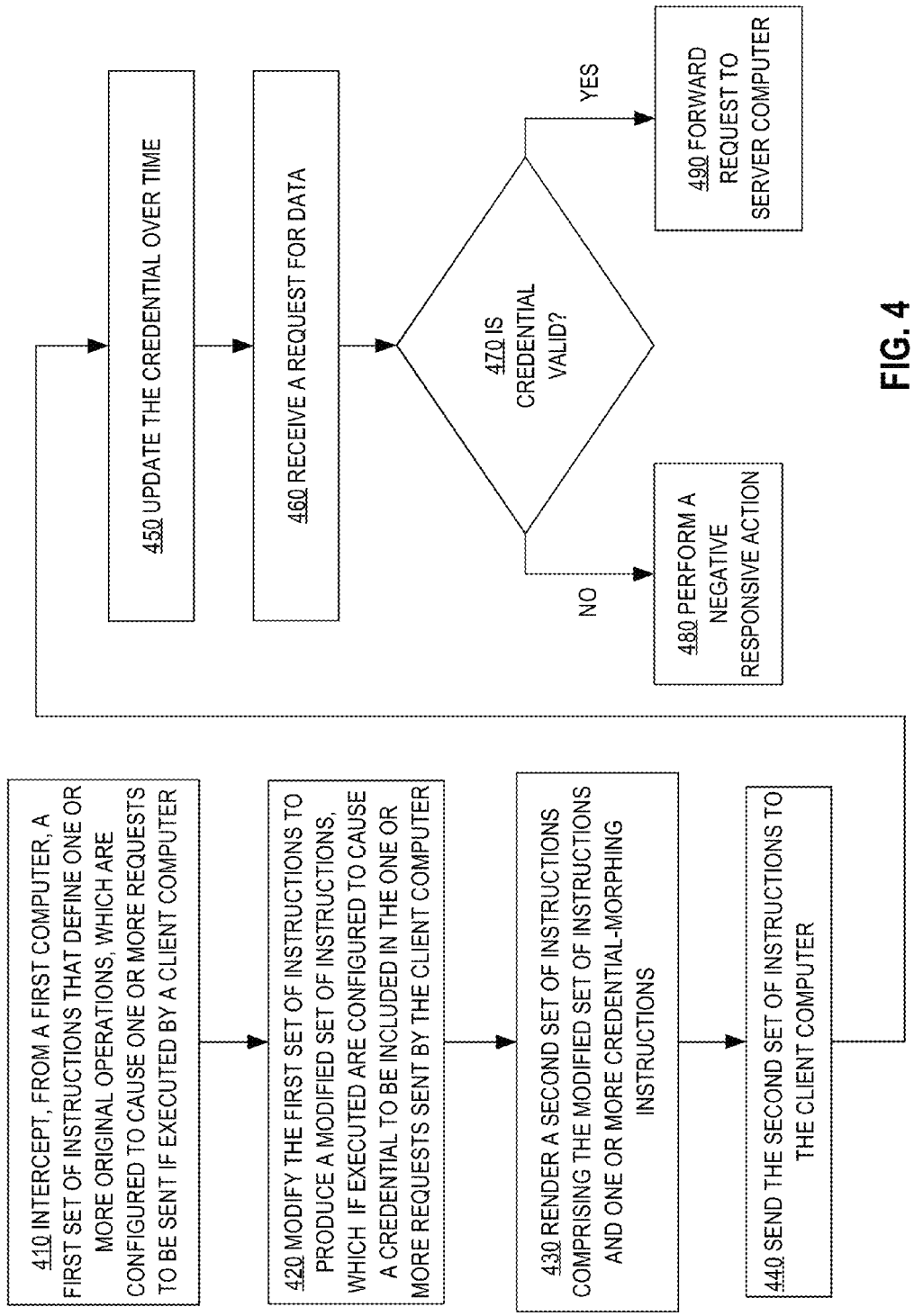
FIG. 4 illustrates a process for validating requests from browsers, and filtering out requests from bots, using one or more dynamic credentials in an example embodiment.

FIG. 4 illustrates a process for validating requests from browsers, and filtering out requests from bots, using one or more dynamic credentials in an example embodiment. In step 610, an intermediary computer intercepts, from a first computer, a first set of instructions that define one or more original operations, which are configured to cause one or more requests to be sent if executed by a client computer. For example, protocol client module 332 may receive instructions from web infrastructure 205. The instructions may comprise HTML, CSS, and/or JavaScript. The HTML, may define one or more links, forms, and/or Uniform Resource Locators ("URLs") that a request may be sent to send and/or receive data.

4.2 Modifying Instructions which Cause a Browser to Submit a Credential with One or More Requests In step 420, the intermediary computer modifies the first set of instructions to produce a modified set of instructions, which if executed are configured to cause a credential to be included in the one or more requests sent by the client computer. For purposes of illustrating a clear example, assume that the instructions received in the previous step comprise HTML, CSS, and JavaScript instructions that define a link, which a browser or bot may use to generate a request for additional data and/or instructions. Processing engine 334 may parse the instructions. Forward transformer 336 may identify the link processed by processing engine 334. Forward transformer 336 may modify the instructions that define the link, such that if the link is selected by a user using a browser, then the browser executes a JavaScript callback that causes the browser to modify the URL, one or more parameters in the URL, and/or data submitted in a request based on the URL, to include a dynamic credential. Accordingly, when the browser generates the request based, at least in part on the URL, the request includes a dynamic credential. The foregoing is an example of a technique for modifying instructions to cause a browser to include a credential in a URL. Other embodiments may use one or more other techniques.

For purposes of illustrating another clear example, assume that the instructions received in the previous step define a form that is associated with a submit method. The submit method may be configured to collect data from one or more of the fields in the form and send the collected data in a request, such as an HTTP POST request, to a server computer. After processing engine 334 parses the instructions, forward transformer 336 may add a new field in the form that includes a dynamic credential. Accordingly, when the submit method is executed, the browser may generate a request that includes the credential stored in the added field with other data from other fields in the form. Additionally or alternatively, forward transformer may generate a wrapper for the previously defined submit method. The wrapper may be configured to call the previously defined submit method and tack on a credential in the payload of the request.

Additionally or alternatively, intermediary computer 230 may determine whether to parse and/or modify instructions based on configuration 232. For example, if protocol client module 332 receives a set of original instructions in response to a request for a particular web page, and configuration 232 includes data that indicates the particular web page is a public page and/or should not be modified, then processing engine 334 and/or forward transformer 336 may send the original instructions to the intended client computer without processing or modifying the instructions. Also for example, if processing engine 334 and/or forward transformer 336 determine that a set of instructions define a particular link to a particular target page and/or URL, and if configuration 232 includes data that indicates the particular link and/or the particular target page and/or URL are protected, then forward transformer 336 may modify the instructions that define the particular link. Similarly, if processing engine 334 and/or forward transformer 336 determine that a set of instructions define a particular link to a particular target page and/or URL, and if configuration 232 includes data that indicates the particular link and/or the particular target page and/or URL are public, then forward transformer 336 may modify the instructions that define the particular link.

In the above examples, the modified instructions may be executed by a browser using one or more particular parsers and/or execution environments, such as JavaScript parser 114, extension execution environment 116, and/or JavaScript execution environment 120. Thus, a bot without the particular parser(s) and/or execution environment(s) needed to parse and execute the modified instructions may not generate a request that includes a dynamic credential. Accordingly, a request for instructions and/or data from a bot may be dismissed, ignored, and/or other responded to in a negative manner.

The modified instructions need not include a valid credential. The modified instructions may merely cause a credential to be included in one or more requests sent by the client computer. How a valid dynamic credential is requested, received, and/or generated is discussed in detail herein.

4.3 Rendering a Second Set of Instructions Comprising Credential-Morphing-Instructions In step 430, the intermediary computer renders a second set of instructions comprising the modified set of instructions and one or more credential-morphing-instructions. The one or more credential-morphing-instructions may define one or more operations causing a browser with a particular parser and/or execution environment to request, receive, generate, and/or update a valid credential that changes over time. For example, forward transformer 336 may render a second set of instructions that include the modified instructions and credential morphing-instructions comprising one or more JavaScript instructions, which if parsed and/or executed are configured to cause a browser to request, receive, generate, and/or update a valid credential that changes over time. Additionally or alternatively, forward transformer 336 may include the credential-morphing-instructions by including a reference to a file with credential-morphing-instructions, such as an additional JavaScript file, in the rendered instructions.

If a bot does not have the particular parser and/or execution environment necessary to execute the credential-morphing-instructions, then the bot may not have a valid dynamic credential to submit with a subsequent request. Accordingly, subsequent requests from bots may be dismissed, ignored, and/or otherwise negatively dealt with as discussed herein. However, requests from browsers may be processed as if uninterrupted by an intermediary.

4.4 Sending the Modified and Credential-Morphing-Instructions to the Client Computer In step 440, the intermediary computer sends the second set of instructions, which comprise the modified instructions and the credential morphing-instructions to the client computer. For example, forward transformer 336 may send the modified instructions in step 420 and the credential-morphing-instructions in step 430 to browser 295.

4.5 Updating the Credential Over Time

In step 450, the client computer parses and/or executes the credential-morphing-instructions and updates the credential over time. The credential-morphing-instructions may cause the client computer, and/or browser executing on the client computer, to perform one or more methods to update a credential over time. In an embodiment, the credential may be stored in storage on a client computer, intermediary computer, and/or storage. The storage may, but need not be, non-volatile storage. When a new credential is received and/or generated, the old credential is deleted. Each newly received and/or generated credential may replace a previous credential at the particular address in memory that the previous credential was stored.

Figure 5:
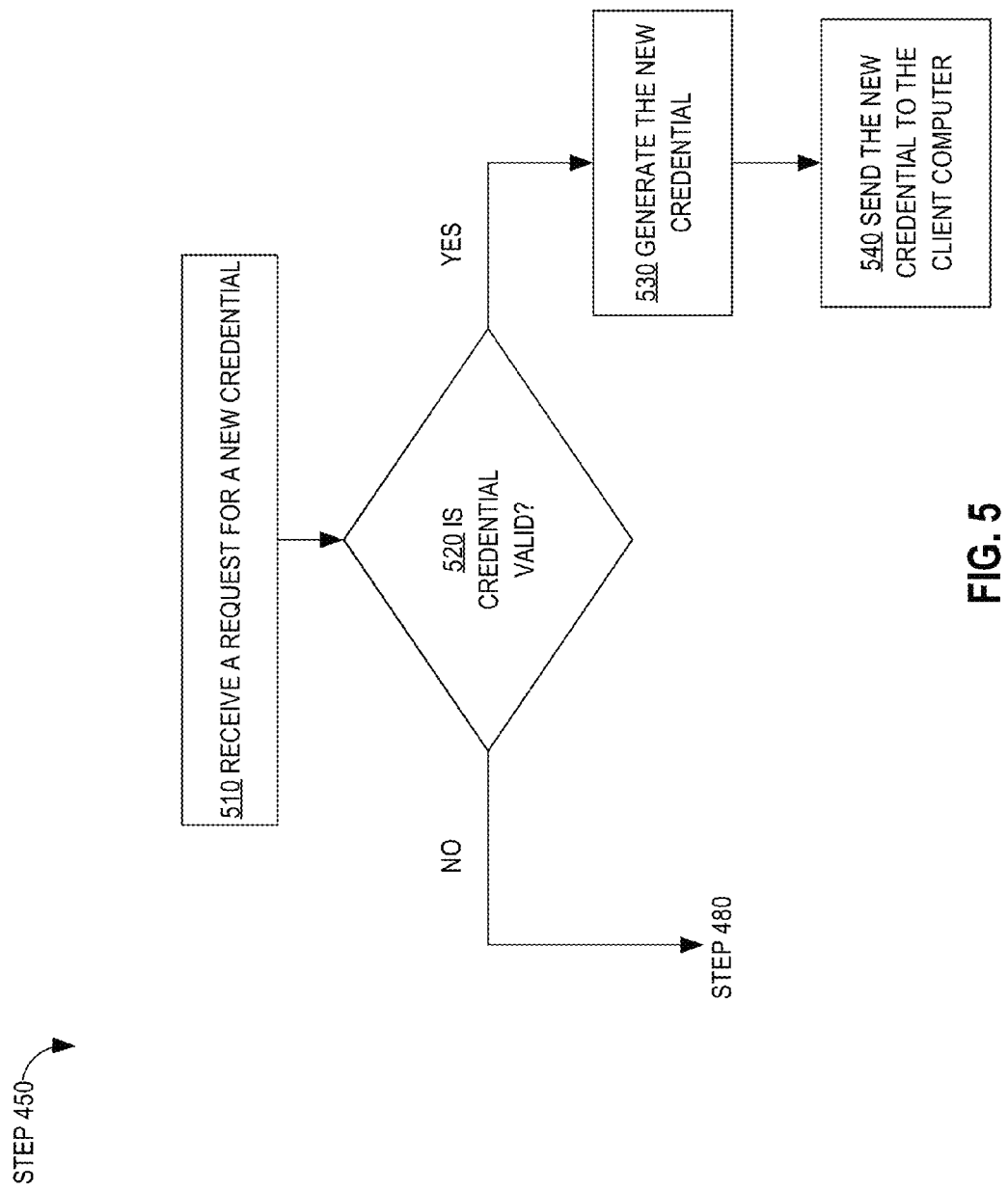
FIG. 5 illustrates a process for updating a credential over time in an example embodiment.

FIG. 5 illustrates a process for updating a credential over time in an example embodiment. In step 510, the intermediary computer receives a request for a new credential. For purposes of illustrating a clear example, assume that browser 295 receives the second set of instructions sent in step 440, and that the credential-morphing-instructions, if executed, are configured to cause browser 295 to request a new credential from intermediary computer 230. Accordingly, browser 295 may parse and/or execute the credential-morphing-instructions using JavaScript parser 114 and JavaScript execution environment 120 to send a request for a new credential to intermediary computer 230. If browser 295 has already received and/or generated a credential, then browser 295 may send one or more of the previously received and/or generated credential in the request. Protocol server module 338 may receive the request and forward the request to credential validation module 340.

4.6 Validating a Credential

In step 520, the intermediary computer determines whether the credential is valid. For example, credential validation module 340 may determine that the old credential is valid if it is stored in storage 240 and/or other storage device. Additionally or alternatively, credential validation module 340 may determine that a credential is valid based on one or more implied and/or express parameters. If credential validation module 340 determines that each of the parameters is satisfied, then control may pass to step 530. Otherwise, control may pass to step 480.

Credential validation module 340 may delete a credential and/or one or more parameters associated with the credential after credential validation module 340 validates the credential. Thus, credential validation module 340 need not validate the same credential more than once.

Bots may request additional web pages quickly compared to a user viewing a page and selecting a link. To thwart and slow down one or more requests from bots, a credential may have a parameter that indicates the credential is invalid for a first amount of time before it becomes valid for a second period of time. Thus, if a bot is able to determine a valid credential and quickly sends a request with the credential to the intermediary computer, the intermediary computer may determine that the credential is invalid and pass to step 480.

A credential may be associated and/or embedded with one or more implied and/or express parameters. For example, a credential may be, and/or be associated with, a timestamp, a time range, an IP address, a subnet, a browser identifier, a username, a password, a keyword, a randomly generated value, and/or any other identifier and/or key that may be used to determine whether a credential is valid.

4.6.1 Implied Parameters

An implied parameter may be a parameter that is inherent to the credential. For example, a credential may be based on time, and credential validation module 340 may determine the time from the credential. Credential validation module 340 may be configured to determine that a credential is valid if the determined time is within a particular amount of time from the current time. Similarly, credential validation module 340 may be configured to determine that a credential is invalid if the determined timestamp identifies a time that is outside a particular amount of time from the current time.

4.6.2 Express Parameters

An express parameter may be a parameter that is associated with, and/or embedded in, a credential. For example, a credential may be associated with a parameter stored in storage 240, which indicates the time at which the credential is no longer valid. Credential validation module 340 may query for the parameter stored in storage 240 based on the credential. If the current time is less than the time retrieved from storage 240, then credential validation module 340 may determine that the old credential is valid. Otherwise, credential validation module 340 may determine that the credential is invalid.

Additionally or alternatively, a credential may include one or more encrypted parameters. Instead of storing one or more parameters in storage 240, credential validation module 340 may generate a credential that comprises one or more encrypted parameters. Credential validation module 340 may validate the credential by decrypting the one or more encrypted parameters and determining whether each of the decrypted parameters is satisfied. If so, then credential validation module 340 may determine the credential is valid. Otherwise, credential validation module 340 may determine the credential is invalid.

4.7 Generating a New Credential

In step 530, the intermediary computer generates a new credential. For example, credential validation module 340 may generate a new credential with one or more implied and/or express parameters. The one or more parameters may include any of the parameters discussed above, and/or any other value, identifier, and/or key that may be used to determine whether the new credential is valid. Credential validation module 340 may store the new credential and/or the one or more parameters in storage 240. Additionally or alternatively, credential validation module 340 may embed one or more parameters in the new credential.

4.7.1 Generating a First Credential

Intermediary computer 230 may not have an old credential to validate. For example, when a browser, such as browser 295, requests a page and/or credential from intermediary computer 230 for the first time, browser 295 may not have an old credential for intermediary computer 230 to validate. If intermediary computer 230 receives a request for a new credential without an old credential to validate, then intermediary computer 230 may generate a credential as discussed in detail herein. Additionally, the credential may be an "initialization credential", which may be used by the browser, and/or the credential-morphing-instructions, to request a new valid credential If intermediary computer 230 receives a request from browser 295 for a new credential with an initialization credential and determines the initialization credential is valid, then intermediary computer 230 may respond with a valid new credential as discussed herein. However, if intermediary computer 230 receives a request from browser 295 for a web page from web infrastructure 205 with an initialization credential, then control may pass to step 480.

In an embodiment, forward transformer 336 may include a credential with the credential morphing-instructions. The credential may be an initialization credential. However, in an embodiment, forward transformer 336 need not include a credential with the credential morphing-instructions.

4.8 Sending a New Credential

In step 540, the intermediary computer may send the new credential to the client computer. For example, credential validation module 340 may send the credential to browser 295 through protocol server module 338.

In an embodiment, credential validation module 340 may send the new credential to forward transformer 336. Forward transformer 336 may generate one or more new credential-morphing-instructions which when executed operate on the credential and/or request a new credential. For example, if executed, the one or more instructions may be configured to replace the previous credential in memory on the client computer. Additionally or alternatively, if executed, the one or more instructions may be configured to indicate when the client computer and/or browser should send a new request for a new credential. Additionally or alternatively, if executed, the one or more instructions may be configured to generate a new credential.

4.8.1 Sending a Seed Value from which the New Credential May be Generated

Figure 6:
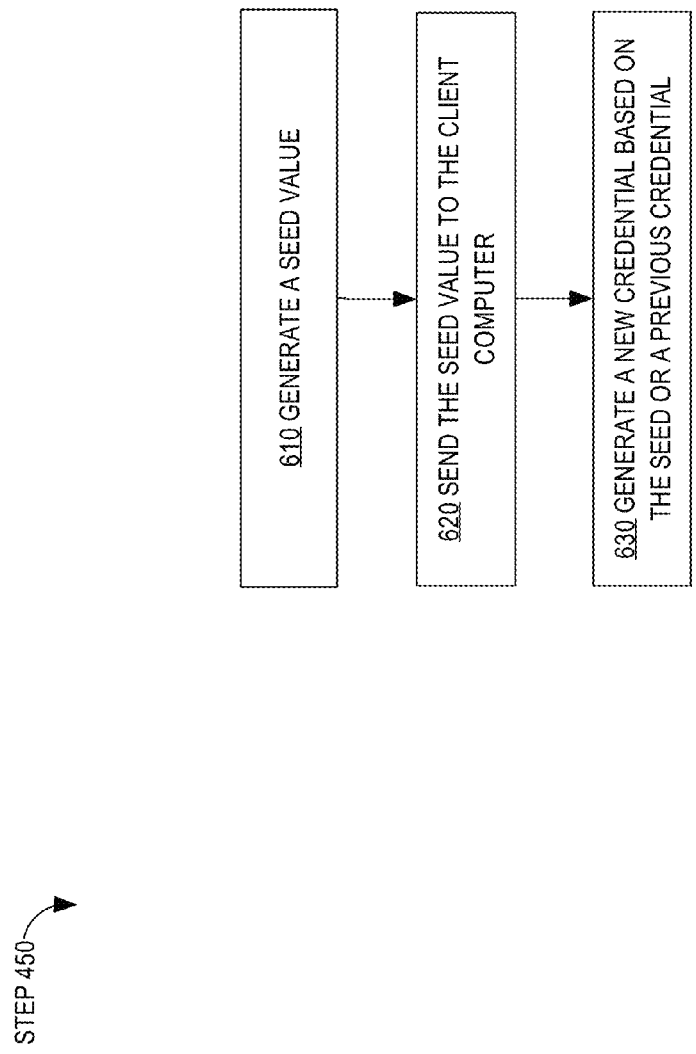
FIG. 6 illustrates a process for generating a seed value and sending the seed value to the client computer to generate one or more new credentials in an example embodiment.

Forward transformer may generate a seed value from a new credential generated by credential validation module, which may be used to generate the new credential by the client computer. FIG. 6 illustrates a process for generating a seed value and sending the seed value to the client computer to generate one or more new credentials in an example embodiment. In step 610, the intermediary computer 230 generates a seed. For purposes of illustrating a clear example, assume forward transformer 336 receives a new credential from credential validation module 340 to be sent to a browser. Forward transformer 336 may generate a seed value based on the new credential.

In step 620, the intermediary computer sends the seed value to the client computer. For example, forward transformer 336 sends the seed value to browser 295.

In step 630, the client computer generates a new credential based on the seed or a previous credential. For example, browser 295 may execute one or more credential-morphing-instructions, which may be configured to generate a valid credential based on a seed received from intermediary computer 230. In an embodiment, over time, browser 295 may execute the credential-morphing-instructions again to generate a new valid credential based on one or more previously generated valid credentials.

4.9 Updating a Credential Over Time

The intermediary computer may repeat steps 450 according to the credential-morphing-instructions. For example, the credential morphing-instructions may define a time period, after which a browser should request, receive, generate, and/or update a new credential as discussed in detail herein.

Forward transformer 336 may render and send one or more new credential morphing-instructions with each credential and/or a seed, which if executed, may be configured to cause the client computer and/or browser to request and/or generate a new credential. The one or more new credential-morphing-instructions may be different than one or more previously sent credential-morphing-instructions.

4.10 Validating a Request for Data

Returning now to FIG. 4, in step 460, the intermediary intercepts a request for data. For example, protocol server module 338 may receive a request from browser 295 for data and/or instructions, such as a web page, from web infrastructure 205.

In step 470, the intermediary computer determines whether the request is valid by determining if the credential included in the request, if any, is valid. For example, protocol server module 338 may forward the request to credential validation module 340. Credential validation module 340 may determine whether the credential is valid based on one or more of the methods discussed herein. If credential validation module 340 determines the credential is valid, then control passes to step 490. Otherwise, control passes to step 480. If credential validation module 340 determines that the request does not include a credential, then control may pass to step 480. If credential validation module 340 determines that the request for data includes an initializing credential, then control may pass to step 480.

If configuration 232 includes data indicating that the data requested is public, such as a home page of a web site, then credential validation module 340 may determine that the request is valid, even though the request did not include a credential. In response, control may pass to step 490. If, however, configuration 232 includes data indicating that the data requested is public, but the request includes an invalid credential, then control may pass to step 480.

4.11 Performing a Negative Responsive Action

In step 480, the intermediary computer performs a negative responsive action. For example, credential validation module 340 may terminate the request. Additionally or alternatively, credential validation module 340 may treat the request as a request for an initializing credential, and in response, generate and send the initializing credential and/or seed value to browser 295 via forward transformer 336, as discussed herein in detail. Additionally or alternatively, the intermediary computer 230 may respond with a message defined by a user and/or administrator through a client computer and/or the intermediary computer. Additionally or alternatively, intermediary computer 230 may respond with one or more standard and/or proprietary error codes and/or messages. For example, intermediary computer may return HTTP error code 400 and a message "Bad Request" to browser 295 and/or client computer 299.

4.12 Forwarding the Request to a Server Computer

In step 490, the intermediary computer forwards the request for data to the server computer. For example, credential validation module 340 may pass the request to reverse transformer 342. Reverse transformer 342 may strip out data relating to the credential and produce a new request which would have been generated by browser 295 had the original instructions been received by browser 295. Reverse transformer 342 may send the new request to web infrastructure 205 through protocol client module 332.

If web infrastructure 205 responds to a forwarded request with data and/or instructions, then intermediary computer 230 may repeat one or more of the steps discussed herein. For example, intermediary computer 230 may perform step 410 in response to receiving the new data and/or instructions from web infrastructure 205.

5.0 Process Overview—Dynamic Polymorphism for Script Code

Embodiments provide numerous improvements over the general idea of transforming a web page with obfuscation or polymorphism to inhibit attacks. In an embodiment, a web security device or service, which is logically positioned between web clients and a web server, applies dynamic polymorphism to original web content. In an embodiment, vulnerable HTML components of a web page are transformed before delivery to web clients, and the web page is modified in a way that causes further transformations in the HTML component after the web page is received at web client and during use or display at the web clients. Using these techniques, when the same web page is accessed by a single client, during the entire time in which the web page is in memory and used or displayed at the client, web content of that page may change one or more times. The nature and frequency of the change may vary for different client accesses to the same web page.

In one improvement, the dynamic polymorphism disclosed herein does not directly change the HTML source code of the original web page. Instead, an improved computer security device as described herein is configured to inject obfuscated script code into the web page after the web page is formed by the web server and before the web page is delivered to a web client. The injected script code is configured, when executed by the browser hosted at the client computer, to dynamically apply one or more changes to the web page before or at the same time that the web page is rendered and/or displayed using the browser. If the web page is viewed using the client browser, the HTML source code will show its original values, and the rendered web components will change value multiple times over time. The polymorphism disclosed herein is termed "dynamic" based upon the repeated periodic changes in the content of web components that may occur over time.

The improved techniques disclosed herein can significantly increase the complexity involved for adversaries to analyze the modified web page, and therefore the security of the browser, client computer and web server are increased.

5.1 Example Computing Topology

Figure 8:
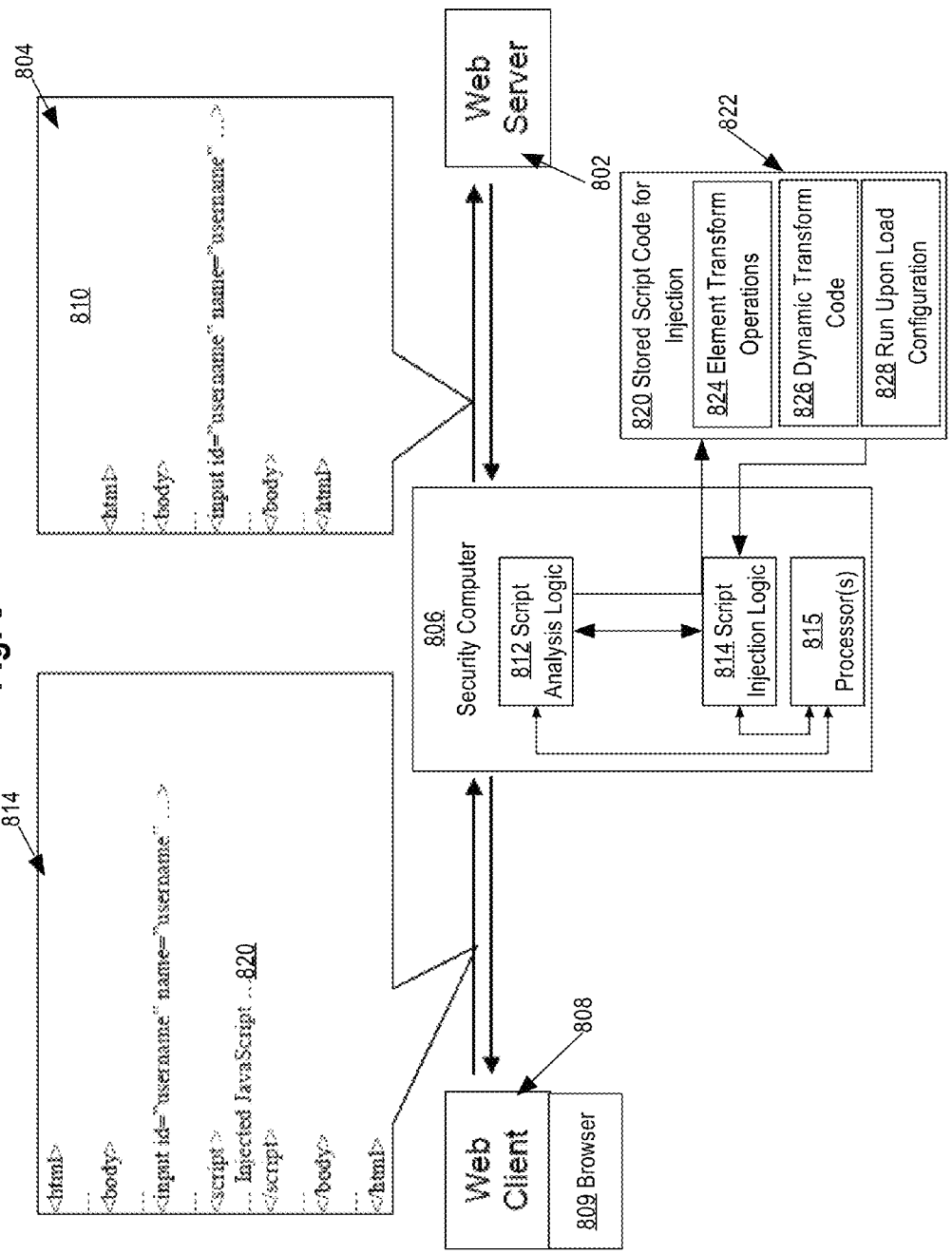
FIG. 8 illustrates a client-server computer system supporting dynamic polymorphism in script code, and with which an embodiment may be used.

FIG. 8 illustrates a client-server computer system supporting dynamic polymorphism in script code, and with which an embodiment may be used. FIG. 8 illustrates a an electronic document before and after processing using an improved security device that is configured to modify an electronic document received from a web server by injecting script code according to an embodiment.

In an embodiment, a web server 802 generates an electronic document 804 under the control of a server-side application program or other facility, and the electronic document is communicated through one or more networks to a client computer 808 or other web client. Typically the electronic document 804 comprises a web page that includes HTML source code. Further, typically the client computer 808 hosts or executes a browser program 809 that is configured to or capable of interpreting script code as part of loading, rendering and causing display of the electronic document on a computer display device associated with the client computer 808. An example of script code is JAVASCRIPT and examples of browser program 809 are APPLE SAFARI, MOZILLA FIREFOX, GOOGLE CHROME, MICROSOFT INTERNET EXPLORER, and others.

Security device 806 is logically positioned between the web server 802 and a client computer 808. In some embodiments, security device 806 may be implemented in the manner of intermediary computer 230 as described above. In various embodiments, security device 806 may be implemented using a special-purpose computer or computing appliance that is located near the web server 802; for example, security device 806 may be co-located in the same data center as the web server. In another embodiment, the security device 806 may be implemented as a service that is accessible over computer networks using application, program or function calls, inter-process messaging, or other mechanisms of inter-computer communication. For example, the security device 806 may comprise one or more computer programs or other software elements that are hosted in one or more instances of computing resources of a cloud computing facility. In various embodiments, the cloud computing facility may be a private cloud facility that is associated with an owner or operator of the web server 802, or a public cloud facility, or a cloud facility of a service provider that is different than an owner or operator of the web server 802.

In various embodiments, the techniques herein may be implemented using a special-purpose computer, a specially configured network infrastructure element such as a router, switch or firewall, or a set of computer programs hosted in a data center or cloud computing facility and implemented as a service that can be called from the web server 802 or another element.

In the arrangement of FIG. 8, the security device 806 receives all electronic documents that the web server 802 generates, before the documents are delivered over one or more networks to the client computer 808. For example, electronic document 804 is received at the security device 806. In response to receiving the electronic document 804, the security device 806 modifies the HTML source code 810 of the document to inject or include a set of new script code 820, resulting in creating a modified electronic document 814. The security device 806 then forwards the modified electronic document 814 into the network(s) toward the client computer 808.

In an embodiment, security computer 806 comprises script analysis logic 812 and script injection logic, and is coupled to a file 822 comprising stored script code for injection. In an embodiment, the script analysis logic 812 is configured to examine an electronic document 804 and source code 810 within the electronic document and identify a location in which new special-purpose script code 820 in file 802 may be inserted or injected. As further described herein, the script analysis logic 812 also may be configured to modify the file 822 of stored script code for injection from time to time. In an embodiment, the script injection logic is configured to place a copy of the stored script code from the file 822 in the electronic document to result in producing a modified electronic document 814 in which the script code has been injected.

The new script code 820 is configured to execute automatically at the client computer 808 when a browser at the client computer loads the modified electronic document 814. For example, the HTML expression <body onload="script( );"> may form a part of the new script code 812, or an expression such as window.onload=function . . . may be used. Other HTML tags or other coding may be used in the new script code 812, provided that the new script code is configured to execute automatically on the client computer 808 promptly after the electronic document 804 is initially loaded.

Synchronization of the security device 806 and the browser at the client computer 808 may be performed in a manner similar to that described above for intermediary computer 230. In the previous description, a keep-alive value stays synchronized between the client browser and the intermediary computer 230; the keep-alive value is synchronized by the client-side browser frequently sending the current keep-alive value to the intermediary computer 230 in exchange for a new keep-alive value. The credential validation module 340 and forward transformer 336 work in concert to validate the current keep-alive value and generate the next keep-alive value. In the approach of FIG. 8, the security device 806 may stay in sync with changes to the client-side JavaScript; for example, credential validation logic 340 and forward transformer logic 336 may operate in concert to validate the modified DOM elements on the client-side.

5.2 Example Process Flow

FIG. 9 illustrates a computer-implemented process of using dynamic polymorphism to improve resistance to attacks embodied in script code.

At block 902, at a security computer that is logically interposed between a server computer that generates electronic documents and a client computer that is capable of executing script code in the electronic documents, the process obtains a particular electronic document that contains source code with values for transformation or obfuscation. In some cases, the process obtains the particular electronic document because the browser program 809 of the web client 808 has requested the original electronic document 804 from the web server 802, for example, using an HTTP request for a particular static or dynamic HTML document. The process may obtain the particular electronic document programmatically, using the interception techniques that have been described herein for intermediary computer 230.

At block 904, the process loads or obtains script code that is configured to cause polymorphic transformation of source code of electronic documents and is configured to run upon loading. For example, security computer 806 loads a copy of the stored script code 802 from file 822. Program instructions in an application program running in security computer 806 may include disk file retrieval operations to accomplish the loading.

As seen at block 910, optionally, the script code may be configured for dynamic modification of element values. Dynamic modification of element values, in this context, means that the script code causes a different change to element values in the particular electronic document at different times after that script code is loaded and interpreted or executed as part of rendering the particular electronic document.

At block 906, the process modifies the particular electronic document by inserting the script code into the electronic document, resulting in producing a modified copy of the particular electronic document. Any of various insertion techniques may be used. For example, the application program running on security computer 806 may create headers for a new well-formed HTTP response in main memory, then write in the script code to the same memory area, then write in the script code, then write in ending tags to complete the well-formed response.

At block 908, the process provides the modified electronic document to the client computer in response to a request for the original electronic document. For example, block 908 may involve the security computer 806 generating and sending the well-formed HTTP response to the web client 808 on behalf of the web server 802, using HTTP server code.

In an embodiment, the new script code 812 is configured to cause, when executing in the browser of the client computer 808, one or more changes in HTML form attributes of the source code 810 of the electronic document 804 that has been loaded into memory of the browser. In one embodiment, the new script code 812 comprises JAVASCRIPT that is configured to search within HTML code in memory of the browser for name-value pairs within INPUT tags of the HTML code and to identify the position of the value, for example by calling HTML DOM method "getElementById( )". When a value is found, the bytes between the quote mark characters are deleted and the same memory is modified to substitute the output of a pseudo-random generator. This algorithm continues until all the HTML code has been inspected or scanned and modified.

Using this approach, if a user invokes the VIEW SOURCE function of the browser, the original untransformed web page is displayed. TABLE 1 illustrates an example of VIEW SOURCE output for a hypothetical web page, with dynamic polymorphism in effect. However, if the user invokes the INSPECT ELEMENT function of the browser, the transformed web page after modification by the new script code 812 is displayed. TABLE 2 illustrates an example of INSPECT ELEMENT output for a hypothetical web page.

TABLE 1

Example VIEW SOURCE Output for Hypothetical Web Page

<fieldest form="sign_in_form">
  <div>
  <label for="username">
  Enter your username:
  </label>
[   <input type= "text" id= "username" name= "username" value= ]
  ""
[ maxlength= "50" size = "20" autofocus /> ]
  <span class = "nodisplay">
  Please enter a username.
  </span>
  </div>
  <div>

TABLE 2

Example INSPECT ELEMENT Output for Hypothetical Web Page

<div id= "login" class= "ent-grid drop-shadow">
  ::before
  <div class "col-1-2 west">
    <form id= "sign-in-form" name= "sign_in_form" method= "POST"
    action= " /
    "application/x-www-form-urlencoded">
      <fieldset form= "sign_in_form>
        <div>
          <label for= "username">
          Enter your username:
          </label>
          <span class= "missing">Please enter a username.</span>
        </div>
      <div> </div>
      <div id="remember">...</div>
      <p>...</p>

This approach provides numerous improvements over the general idea of modifying a web page to obfuscate its content or confuse an analyst or a bot. For example, because the HTML page source is not changed, attackers that only analyze the HTML page source code will not know that the countermeasure described herein has been implemented. For attackers that analyze the Document Object Model (DOM), for example, using INSPECT ELEMENT, the conflicting contents of the output from VIEW SOURCE and INSPECT ELEMENT will require investigation. Even if this investigation results in identifying the presence of the new script code 812, that code will appear in obfuscated form. Understanding the total content of the HTML source code, INSPECT ELEMENT output, and script code 812 will require extensive and difficult reverse engineering effort.

From Table 2, it will be apparent that the injected script code has changed the values of certain elements of the HTML elements in the electronic document. For example, the element with id="username" has been transformed to id="m7x8faxuyt", and the element with name="username"

has been transformed to name="eiu9tzvb7r". To perform such a transformation, the injected script code includes the obfuscated values "m7xfaxuyt" and "eiu9tzvb7r" as coded variables or constants. The obfuscated values may be generated using a random number generator or pseudo-random number generator within an application program in the security device 206 that implements FIG. 9. Both the injected script code that is delivered to the browser, and the application program on the security device 206, may implement symmetric transformation operations and may include a seed value, which can be carried in the clear in the script code, so that clock synchronization or a protocol such as NTP are not required to synchronize the browser and server and permit transformation of an obfuscated element value back into a clear source value.

In an embodiment, any one or more of the obfuscated values may be carried in the injected script code in segments that are reassembled and used by the script code when it executes in the browser. For example, the value "m7xfaxuyt" can be segmented in the injected script code using three (3) segments that are combined into a final value at runtime using the code snippet shown in TABLE 3.

TABLE 3

SEGMENTED OBFUSCATION CONSTANT VALUES var s1 = "m7";
var s2 = "x8fax"
var s3 = "uyt"
var final = s1 + s2 + s3;

In various embodiments, the number of segments may be different, and the length of each segment may vary. The number of segments that are used, and the length of each segment, may change in a pseudo-random manner from page to page. For example, in the page excerpt shown in TABLE 1, TABLE 2, the value may be split into three (3) variables and the next time it may be split into four (4) or five (5). The use of variable segmentation in this manner is expected to increase the time and cost involved in reverse engineering the resulting electronic document and the injected script code.

In one embodiment, a file 822 containing the injected script code is stored at the security computer 806 or in a location that the security computer can access. In one embodiment, the file 822 is static and used for all different electronic documents 804 that the web server 802 generates or that the security computer 806 processes. In another embodiment, the contents of the file 822 may change over time so that different script code is injected into the electronic documents at different times; a control path from script analysis logic 812 to stored script code file 822 is shown in FIG. 8 for this purpose. Thus, the script analysis logic 812 may be configured to modify the file 822 from time to time to change the contents of the script code to be injected; the changes may include different numbers or lengths of segments of the type shown in TABLE 3, or may include completely different obfuscation approaches or techniques other than the use of segmented constants or variables. Therefore, the script code file 822 may adapt, over time, to changing attack modes or to new concepts of the best practices that are appropriate to use to thwart attacks.

In an embodiment, the script code to be injected, in file 822, is configured for periodic execution, for example using JAVASCRIPT repeat function calls that cause the browser to perform repeated periodic execution of all or a part of the script code. In an embodiment, the periodic execution capability is used to further change the protected HTML form attributes, after the initial change that occurs when the modified electronic document 814 is loaded in the browser and executed. As an example, the script code may be configured to perform the changes to the modified electronic document, for one particular HTML element, which are shown in TABLE 4.

TABLE 4

RESULTS OF PERIODIC REPEATED CODE EXECUTION

| Time | Element ID | Element Name |
| --- | --- | --- |
| (Original electronic document 804) | "username" | "username" |
| (Modified electronic document 814 as loaded) | "m7x8faxuyt" | "eiu9tzvb7r" |
| 1 second after loaded | "x8faxuytm7" | "tzvb7reiu9" |
| 2 seconds after loaded | "uytm7x8fax" | "zvb7reiu9t" |

TABLE 5 provides an example of pseudo script code that could be injected on a HTML page with one form field element. The injected code, specifically the transform function will transform the HTML form field element name and ID ("username") after the page is loaded, and continue to transform it every 1 second, within the first 2 seconds. A "set interval" function can be used to instruct the client browser to execute the transform function every second. The pseudo script code also uses obfuscated transformation values using the string concatenation method described above; this is just one of many obfuscation techniques the security device can apply. The function name and variable names can also be obfuscated to difficult-to-read values. This pseudo script code will cause the "username" to change in the way specified in Table 4.

TABLE 5

EXAMPLE INJECTED CODE variable declarations:
transform names = ["a1", "a2", "a3"];
transform ids = ["i1", "i2", "i3"];
current id = "username";
s1 = "m7";
s2 = "x8fax";
s3 = "uyt";
t1 = "eiu9";
t2 = "t";
t3 = "zvb7r";
first id transform = s1+s2+s3;
first name transform = t1+t2+t3;
(other declarations of other id transforms and name transforms up to the maximum allowed value of the index value i below)
transform function declaration:
let elem = the element of the document that matches the "current id"
for a number of times indicated in an index value i,
    let element id = the ith id transform;
    let current id = the ith transform ids;
    let element name = the ith name transform;
    increment i;
repeat.
include an 'execute on load' script instruction
include a method to post the transformed value to the server when the element matching the current id is submitted by the user
call the transform function every 1 seconds TABLE 7 below presents another example on the same HTML form field. In the example of TABLE 7, the transform function is modified to cause changing the form field name and ID for as long as the code runs, every 1 second. The transform function shifts the name and ID string values by one character every time it is called. It will result in the sequence specified in TABLE 6.

TABLE 6

RESULTS OF PERIODIC REPEATED CODE EXECUTION

| Time | Element ID | Element Name |
|---|---|---|
| (Original electronic document 804) | "username" | "username" |
| (Modified electronic document 814 as loaded) | "abcdefghi" | "123456789" |
| 1 second after loaded | "iabcdefgh" | "234567891" |
| 2 seconds after loaded | "hiabcdefg" | "345678912" |
| 3 seconds after loaded | "ghiabcdef" | "456789123" |
| ... | ... | ... |

TABLE 7

EXAMPLE INJECTED CODE variable declarations:
current id = "username";
transform name = "123456789";
transform id = "abcdefghi";
transform function declaration:
let elem = the element of the document that matches the "current id"
   let element-id be the transform id;
   let current-id be the transform id;
   let elem-name be the transform name;
   let the transform name be a concatenation of substring (1,8)
of the transform name and substring (0,1) of the transform name;
   let the transform id be a concatenation of the substring
(8,1) of the transform id and substring (0,8) of the transform id;
include an 'execute on load' script instruction
include a method to post the transformed value to the server
when the element matching the current id is submitted by the user
call the transform function every 1 seconds In various embodiments, any of the specific transformed values shown under CONTENT in TABLE 4 may be further obfuscated or hidden in the script code using other techniques.

The values shown under CONTENT in TABLE 4 can be based upon the initial transformed value, for example "m7x8faxuyt" as shown, using a pseudo-random generating algorithm implemented in software code in the security device 806, or using special-purpose digital logic that is also configured to perform pseudo-random number generation. The time interval between modifications is shown, in TABLE 4 as an example, as a consistent or monotonically increasing value of 1 second. In other embodiments, the time interval may be other than 1 second. Because the security device 806 controls the modification of the file 822 that contains the script code to be injected, the security device necessarily has the time interval stored or available. When the time interval is relatively large, such as whole integer values of seconds, to validate the transformed values shown under CONTENT in TABLE 4 or other transformed values, the processes herein do not require precise clock synchronization with the client computer 808.

Because all the details of the transformation are carried on the modified electronic document 814, the security computer 806 does not need state information to apply a reverse transformation.

The original electronic document 804 may include values indicating whether static polymorphism is used to protect the page or whether dynamic polymorphism as described herein is used. In an embodiment, the security computer 806 implements both static polymorphism and dynamic polymorphism as described herein. Values that the web server 802 embeds in the original electronic document 804 may signal or instruct the security 806 to perform either static polymorphism or dynamic polymorphism on each electronic document that the web server 802 emits that is received at the security device.

The process described for FIG. 9 may be implemented, in various embodiments, using any of a variety of procedural or object-oriented programming languages. For example, JAVA programming can be used to implement the logic of FIG. 9. The script code that is loaded at block 904 may be JAVASCRIPT or another form of script; that code may comprise a code snippet that can be inserted into HTML source code that the server computer outputs using a concatenation, merge, or file rewriting operation implemented using JAVA.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
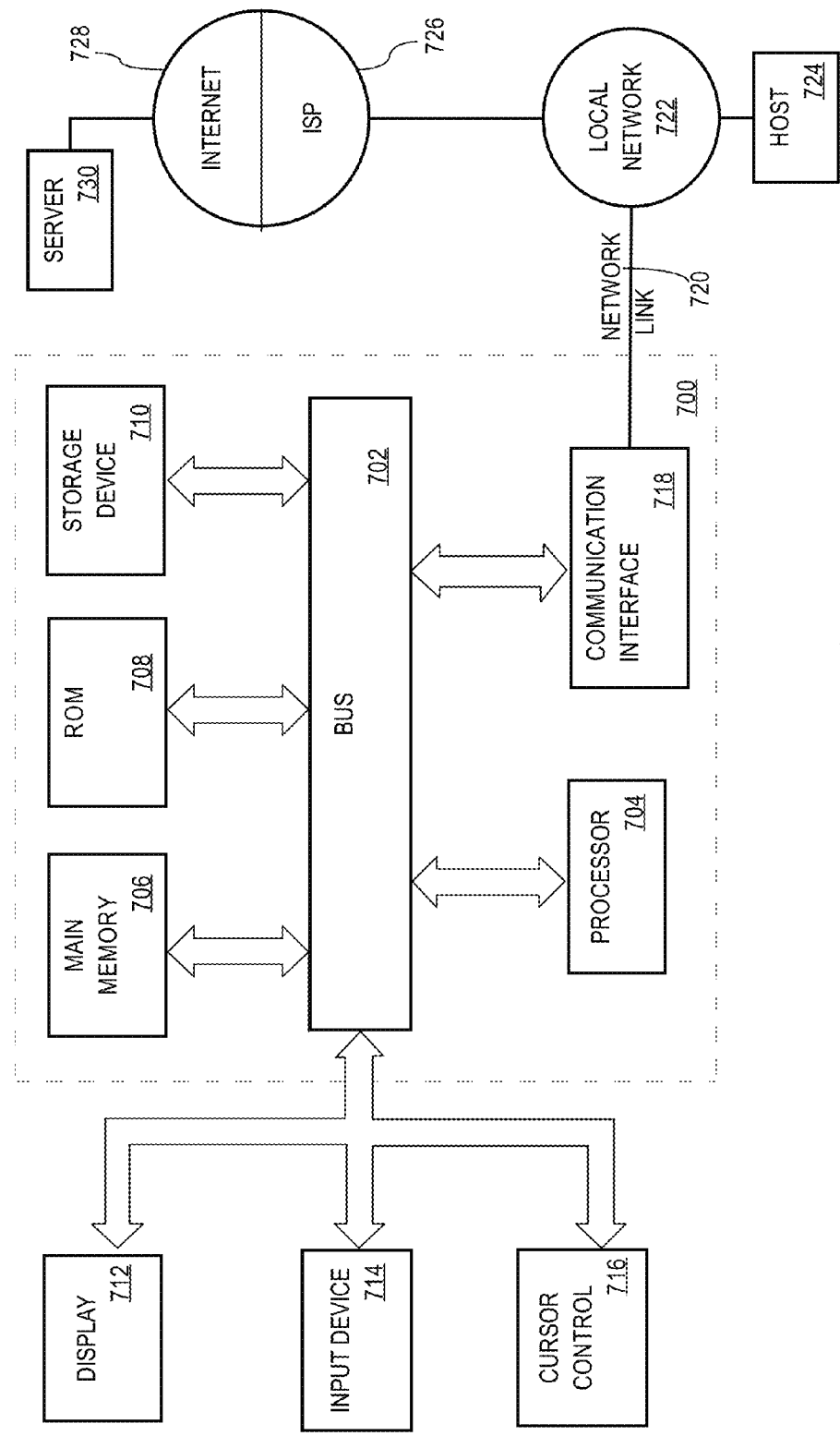
FIG. 7 illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7.0 Other Aspects of Disclosure

Using the networked computer arrangements, intermediary computer, and/or processing methods described herein, security in client-server data processing may be significantly increased. Dynamic credential techniques discussed herein effectively reduce automated attacks. Consequently, one or more various attacks, such as a denial of service ("DOS") attack, credential stuffing, fake account creation, ratings or results manipulation, man in the browser attacks, reserving rival goods or services, scanning for vulnerabilities, and/or exploitation of vulnerabilities, are frustrated because requests are accompanied by a credential that changes over time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing system configured to improve resistance of a client computer to attacks and comprising:
one or more hardware processors;
script analysis logic coupled to the one or more processors and configured to obtain a particular electronic document from a server computer;
script injection logic coupled to the one or more processors and configured to insert a set of script code into source code of the electronic document to result in producing a modified electronic document prior to providing the modified electronic document to a client computer;

wherein the script code is configured to:

improve resistance of the client computer to attacks by running upon loading in the client computer and to cause transforming, when running in the client computer, one or more values of one or more elements of the source code of the electronic document into obfuscated values of the one or more elements, repeatedly periodically execute in the client computer after loading in the client computer, and cause the transforming in a different manner at each time that the script code repeatedly periodically executes in the client computer.

2. The data processing system of claim 1, wherein the script code is configured to cause the transforming using a pseudo-random transformation of the values of the elements.

3. The data processing system of claim 1, wherein the script code comprises two or more segments of a particular obfuscated value, and wherein the script code is configured to cause transforming a particular value of a particular element of the source code into a particular combination of the two or more segments.

4. The data processing system of claim 3, wherein the script code is configured to cause transforming the particular value of the particular element of the source code into a pseudo-randomly selected combination of the two or more segments.

5. The data processing system of claim 3, wherein the script code is configured to cause transforming the particular value of the particular element of the source code into a randomly selected combination of the two or more segments.

6. The data processing system of claim 1, wherein the script code is configured to repeatedly periodically execute in the client computer at time intervals specified using a time interval value in the script code, and wherein the script injection logic is configured to periodically update the time interval value in the script code to a different time interval value.

7. The data processing system of claim 1, wherein the script code comprises JAVASCRIPT script code.

8. A data processing method of improving resistance of a client computer to attacks comprising:

at an intermediary computer:

obtaining a particular electronic document from a server computer;

inserting a set of script code into source code of the electronic document to result in producing a modified electronic document;

providing the modified electronic document to a client computer;

wherein the script code is configured to:

improve resistance of the client computer to attacks by running upon loading in the client computer and to cause transforming, when running in the client computer, one or more values of one or more elements of the source code of the electronic document into obfuscated values of the one or more elements, repeatedly periodically execute in the client computer after loading in the client computer, and cause the transforming in a different manner at each time that the script code repeatedly executes in the client computer.

9. The data processing method of claim 8, wherein the script code is configured to cause the transforming using a pseudo-random transformation of the values of the elements.

10. The data processing method of claim 8, wherein the script code comprises two or more segments of a particular obfuscated value, and wherein the script code is configured to cause transforming a particular value of a particular element of the source code into a particular combination of the two or more segments.

11. The data processing method of claim 10, wherein the script code is configured to cause transforming the particular value of the particular element of the source code into a pseudo-randomly selected combination of the two or more segments.

12. The data processing method of claim 10, wherein the script code is configured to cause transforming the particular value of the particular element of the source code into a randomly selected combination of the two or more segments.

13. The data processing method of claim 8, wherein the script code is configured to repeatedly periodically execute in the client computer at time intervals specified using a time interval value in the script code, and further comprising periodically updating the time interval value in the script code to a different time interval value.

14. The data processing method of claim 8, wherein the script code comprises JAVASCRIPT script code.

15. A data processing method of improving resistance of a client computer to attacks comprising:

using a security computer that is logically interposed between a server computer that generates HTML documents and a client computer, obtaining a HTML electronic document from the server computer;

inserting a set of JAVASCRIPT script code into HTML source code of the HTML document to result in producing a modified HTML document;

providing the modified HTML document to the client computer;

wherein the JAVASCRIPT code is configured to:

improve resistance of the client computer to attacks by running upon loading in the client computer and to cause transforming, when running in the client computer, one or more values of one or more elements of the HTML source code of the HTML document into obfuscated values of the one or more elements, repeatedly periodically execute in the client computer at time intervals specified using a time interval value in the JAVASCRIPT code after loading in the client computer, and periodically updating the time interval value in the JAVASCRIPT code to a different time interval value.

16. The data processing method of claim 15, wherein the JAVASCRIPT code is configured to cause the transforming using a pseudo-random transformation of the values of the elements.

17. The data processing method of claim 15, wherein the JAVASCRIPT code comprises two or more segments of a particular obfuscated value, and wherein the JAVASCRIPT code is configured to cause transforming a particular value of a particular element of the HTML source code into a particular combination of the two or more segments.

18. The data processing method of claim 17, wherein the JAVASCRIPT code is configured to cause transforming the particular value of the particular element of the HTML source code into a pseudo-randomly selected combination of the two or more segments.

19. The data processing method of claim 17, wherein the JAVASCRIPT code is configured to cause transforming the particular value of the particular element of the HTML source code into a randomly selected combination of the two or more segments.

20. The data processing method of claim 15, wherein the JAVASCRIPT code is configured to repeatedly periodically execute in the client computer, and wherein the JAVASCRIPT code is configured to cause the transforming in a different manner at each time that the JAVASCRIPT code repeatedly periodically executes in the client computer.

* * * * *